(12) United States Patent
Augustin et al.

(10) Patent No.: US 11,614,485 B2
(45) Date of Patent: Mar. 28, 2023

(54) DEVICES AND METHODS FOR SAFETY MECHANISMS

(71) Applicant: Infineon Technologies AG, Neubiberg (DE)

(72) Inventors: Michael Augustin, Villach (AT); Ketan Dewan, Unterhaching (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 17/318,168

(22) Filed: May 12, 2021

(65) Prior Publication Data

US 2021/0396806 A1    Dec. 23, 2021

(30) Foreign Application Priority Data

May 14, 2020   (DE) .......................... 102020113135.6

(51) Int. Cl.
| | |
|---|---|
| *G01R 31/3177* | (2006.01) |
| *H03M 3/00* | (2006.01) |
| *H04L 43/16* | (2022.01) |
| *G01R 31/00* | (2006.01) |
| *G01R 31/08* | (2020.01) |
| *H04L 1/24* | (2006.01) |
| *G06F 119/10* | (2020.01) |

(52) U.S. Cl.
CPC .......... *G01R 31/3177* (2013.01); *G01R 31/00* (2013.01); *G01R 31/005* (2013.01); *G01R 31/006* (2013.01); *G01R 31/007* (2013.01); *G01R 31/08* (2013.01); *G01R 31/088* (2013.01); *G06F 2119/10* (2020.01); *H03M 3/458* (2013.01); *H04L 1/242* (2013.01); *H04L 43/16* (2013.01)

(58) Field of Classification Search
CPC ..... H04L 43/16; H04L 1/242; H04L 43/0823; G06F 2119/10; G01R 31/3177; G01R 31/088; G01R 31/007; G01R 31/00; G01R 31/005; G01R 31/006; G01R 31/02; G01R 31/021; G01R 31/024; G01R 31/08; H03M 3/458
See application file for complete search history.

(56) References Cited

U.S. PATENT DOCUMENTS

| | | | |
|---|---|---|---|
| 2007/0053287 A1* | 3/2007 | Li .......................... | H04W 28/22 370/229 |
| 2012/0308027 A1* | 12/2012 | Kwatra ............ | G10K 11/17817 381/71.11 |
| 2016/0131696 A1* | 5/2016 | Forster ................. | G01R 31/088 327/1 |
| 2018/0183545 A1* | 6/2018 | Subramaniam .... | H04B 7/18543 |
| 2019/0324751 A1 | 10/2019 | Boschi | |

* cited by examiner

*Primary Examiner* — Cynthia Britt
*Assistant Examiner* — Sazzad Hossain
(74) *Attorney, Agent, or Firm* — Eschweiler & Potashnik, LLC

(57) ABSTRACT

A safety mechanism device includes measuring whether a first output signal or results meets dynamically adjustable boundary criterion. The safety mechanism compares the first output signal with at least one boundary signal that is dynamically adjusted. The safety mechanism can produce a dynamically or automatically adjusted boundary signal using a second output signal. The second output signal can mimic the first output signal.

18 Claims, 44 Drawing Sheets

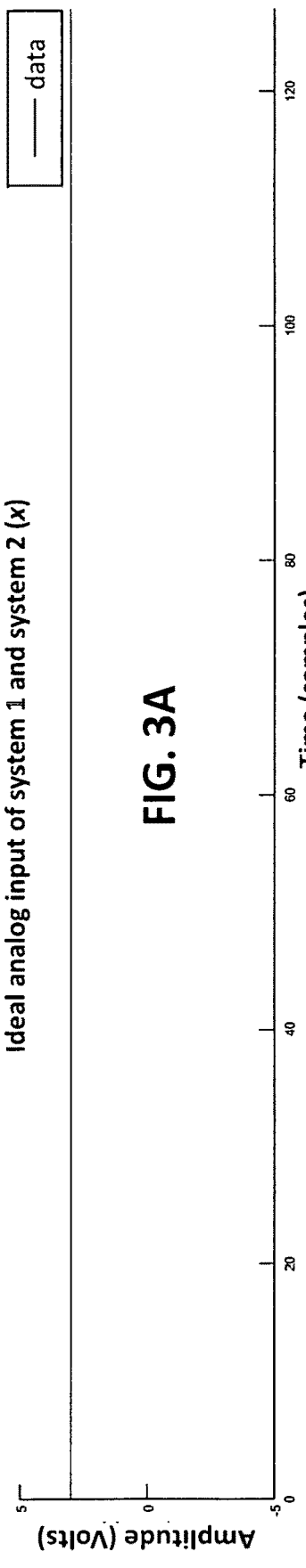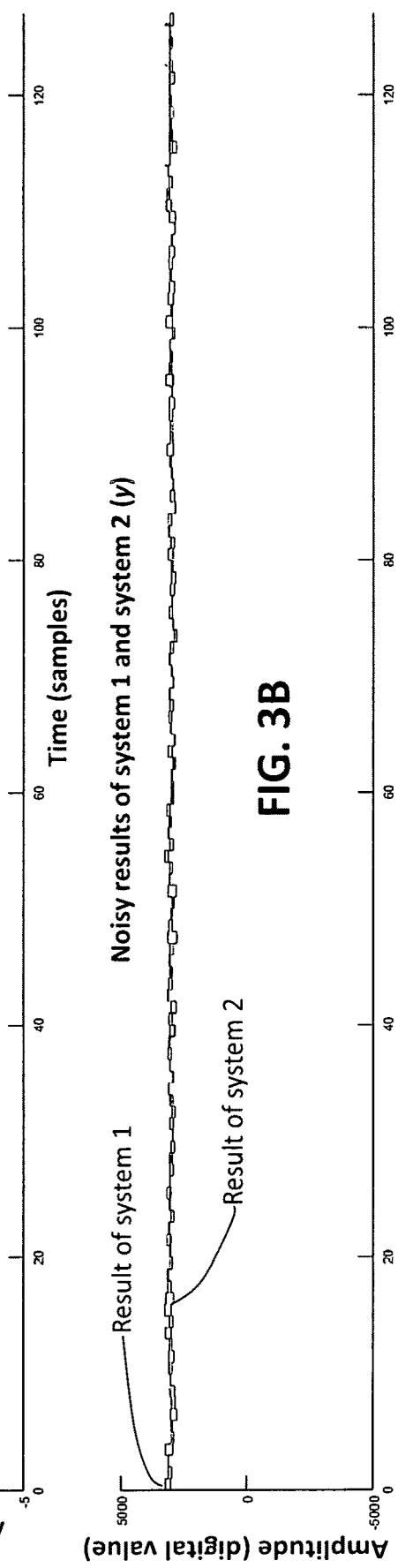
FIG. 3A
FIG. 3B
FIG. 3C

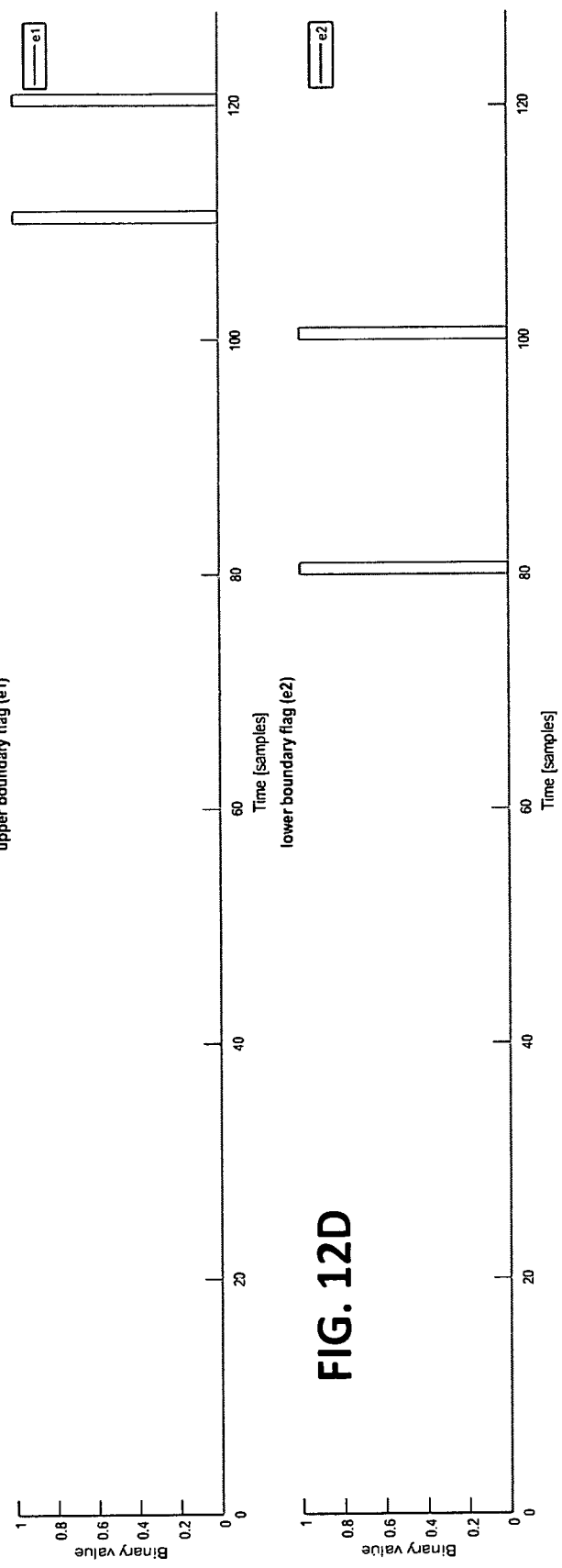

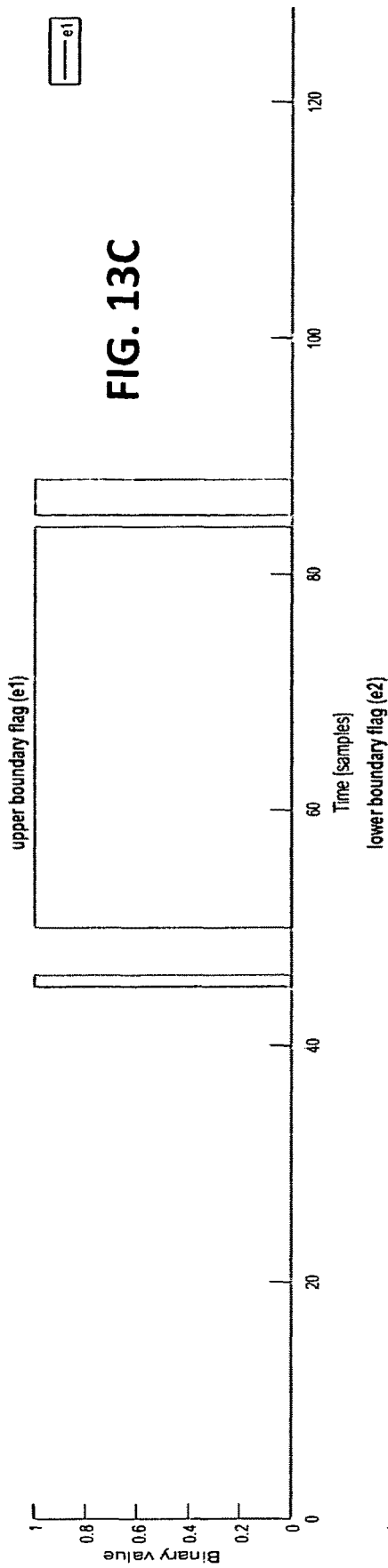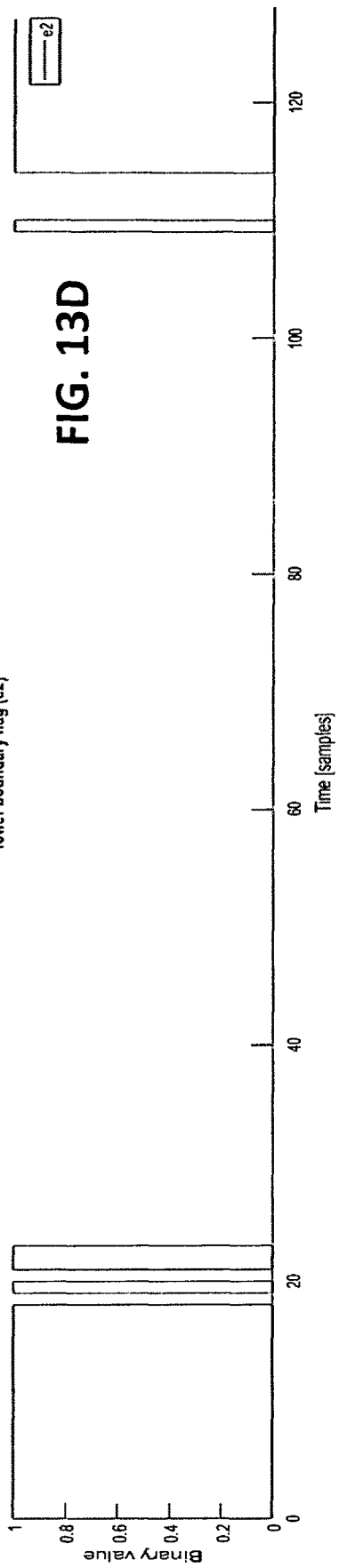

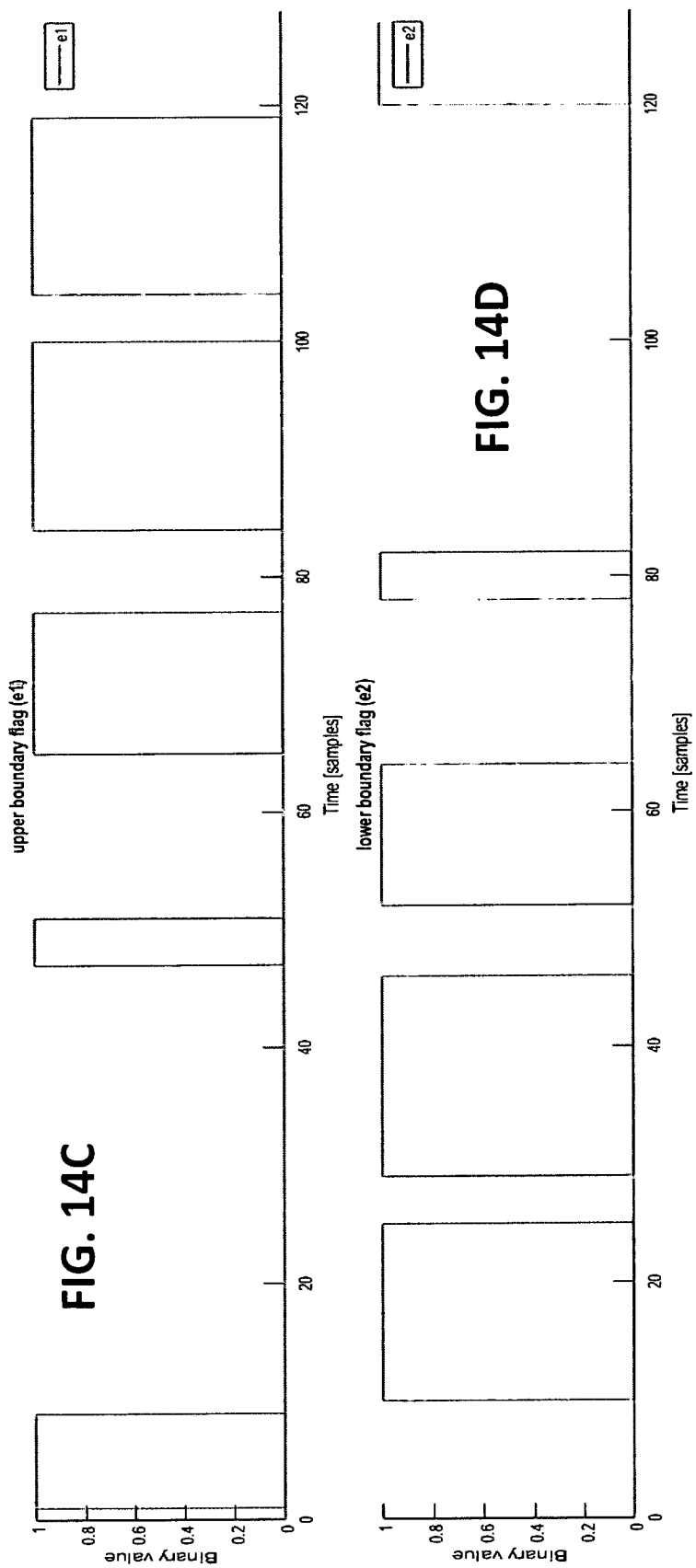

//  DEVICES AND METHODS FOR SAFETY MECHANISMS

REFERENCE TO RELATED APPLICATION

This application claims priority to German Application No. 10 2020 113 135.6, filed on May 14, 2020, the contents of which are hereby incorporated by reference in their entirety.

TECHNICAL FIELD

Various embodiments relate generally to electronic safety mechanisms.

BACKGROUND

Various devices or systems implement safety checks or safety mechanisms. Known safety checks or safety mechanisms may be implemented in software or hardware. For example, a known safety mechanism may be implemented by comparing results from the system with results from redundant results obtained a redundant or duplicate system. However, such a mechanism implemented by software may be computationally expensive as thus limiting system resources. Further the time required for data post processing and analysis which may be suitable or a big disadvantage for real-time applications.

Further such a safety mechanism may also be check implemented in hardware. That is a hardware approach may include having the output of each two systems, that are designed to calculate the same function, compared to each other. This hardware safety mechanism approach however may produce false errors because the inputs to the systems may differ and the systems may not calculate the exact same functions due to variances in manufacturing, noise, temperature dependency, etc. As a result, a comparison may not tolerate or accept differences due to variances and thus incorrectly indicate false errors.

Accordingly, approaches for implementing safety mechanisms that allow efficient driving while ensuring high safety are desirable.

BRIEF DESCRIPTION OF THE DRAWINGS

In the drawings, like reference characters generally refer to the same parts throughout the different views. The drawings are not necessarily to scale; emphasis instead generally being placed upon illustrating the principles of the invention. In the following description, various embodiments of the invention are described with reference to the following drawings, in which:

FIGS. 2A-2C and FIGS. 3A-3E include graphs of simulated inputs and results for the safety mechanism of FIG. 1;
FIGS. 12A-12D, FIGS. 13A-13D, and FIGS. 14A-14D include graphs of simulated inputs and results for the safety mechanism of FIG. 11.

DESCRIPTION

Figure 1:
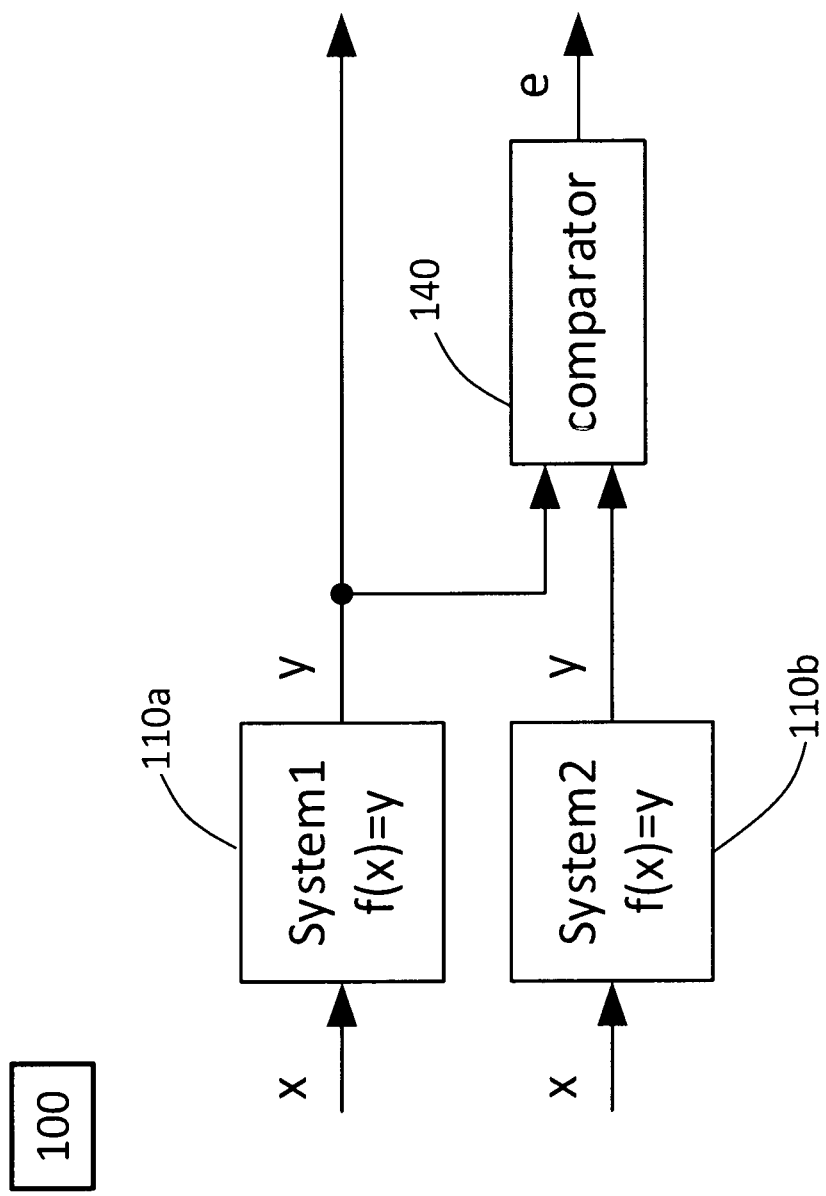
FIG. 1 shows a safety mechanism.

The following detailed description refers to the accompanying drawings that show, by way of illustration, specific details and embodiments in which the invention may be practiced.

The word "exemplary" is used herein to mean "serving as an example, instance, or illustration." Any embodiment or design described herein as "exemplary" is not necessarily to be construed as preferred or advantageous over other embodiments or designs.

The words "plurality" and "multiple" in the description or the claims expressly refer to a quantity greater than one. The terms "group (of)", "set [of]", "collection (of)", "series (of)", "sequence (of)", "grouping (of)", etc., and the like in the description or in the claims refer to a quantity equal to or greater than one, i.e. one or more. Any term expressed in plural form that does not expressly state "plurality" or "multiple" likewise refers to a quantity equal to or greater than one. The terms "proper subset", "reduced subset", and "lesser subset" refer to a subset of a set that is not equal to the set, i.e. a subset of a set that contains less elements than the set.

As used herein, "memory" is understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, registers, shift registers, processor registers, data buffers, etc., are also embraced herein by the term memory. A single component referred to as "memory" or "a memory" may be composed of more than one different type of memory, and thus may refer to a collective component comprising one or more types of memory. Any single memory component may be separated into multiple collectively equivalent memory components, and vice versa. Furthermore, while memory may be depicted as separate from one or more other components (such as in the drawings), memory may also be integrated with other components, such as on a common integrated chip or a controller with an embedded memory.

The term "software" refers to any type of executable instruction, including firmware.

Exemplary embodiments of the present disclosure can be realized by one or more computers (or computing devices) reading out and executing computer-executable instructions recorded on a storage medium (e.g., non-transitory computer-readable storage medium) to perform the functions of one or more of the herein-described embodiment(s) of the disclosure. The computer(s) may comprise one or more of a central processing unit (CPU), a microprocessing unit (MPU), or other circuitry, and may include a network of separate computers or separate computer processors. The computer-executable instructions may be provided to the computer, for example, from a network or a non-volatile computer readable storage medium. The storage medium may include, for example, one or more of a hard disk, a random-access memory (RAM), a read-only memory (ROM), a storage of distributed computing systems, an optical drive (such as a compact disc (CD), digital versatile disc (DVD), or Blu-ray Disc (BD), a flash memory device, a memory card, and the like. By way of illustration, specific details and embodiments in which the invention may be practiced.

FIG. 1 shows a safety mechanism 100. The safety mechanism includes a circuit arrangement implementing a duplication and comparison approach for safety checking. The safety mechanism 100 includes two systems 110a (system 1), and 110b (system 2) that each may be designed or intended to calculate the same function f(x)=y where the input x is the same for both systems. The safety mechanism 100 further includes a comparator 140 for checking the equality of the results from systems 110a and 110b. In cases where the results of these systems differ, the comparator generates an error indication signal e according to the function:

$$f_{comparator}(x) = \begin{cases} 1, & \text{if } y \text{ of System } 110a \neq y \text{ of System } 110b \\ 0, & \text{otherwise} \end{cases}$$

The duplication and comparison can also be implemented in various ways e.g. with two-rail logic or other diverse circuitries, e.g., duplication by time shifted data processing, with self-checking comparators etc. This method can be applied to purely digital functions. In the error free case, the digital functions from each system will calculate the same result $f_{system1}(x)=f_{system2}(x)=y$. In cases of a fault, e.g., $f_{system1}(x) \neq f_{system2}(x)$, the comparator will detect and indicate an error.

Figure 2A:
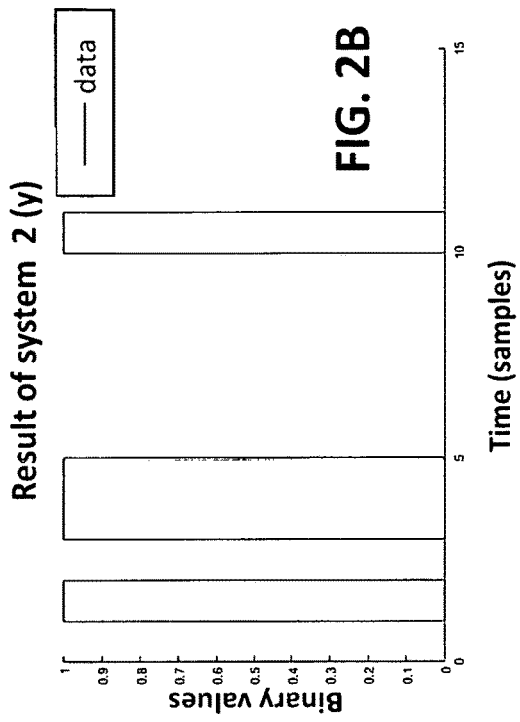
Figure 2B:
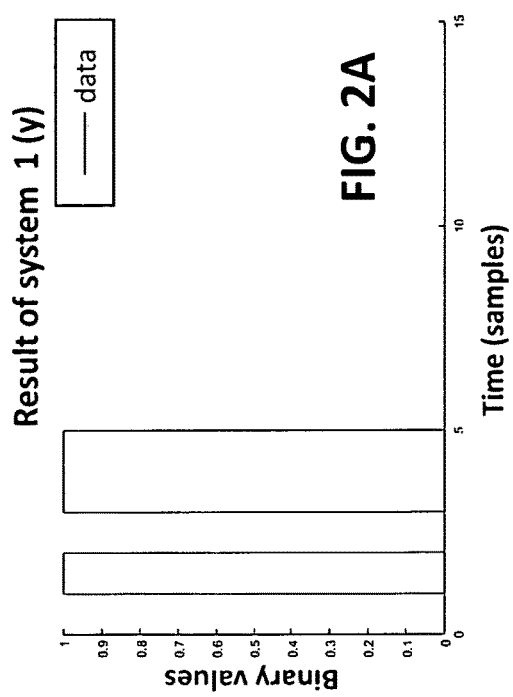
Figure 2C:
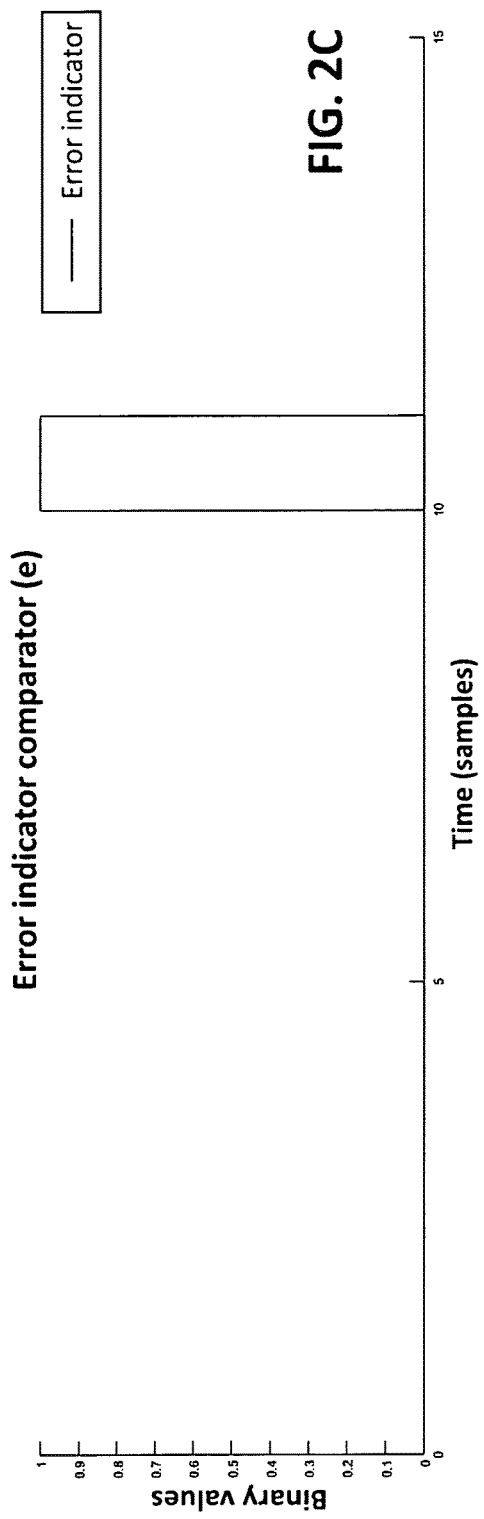
Figure 3D:
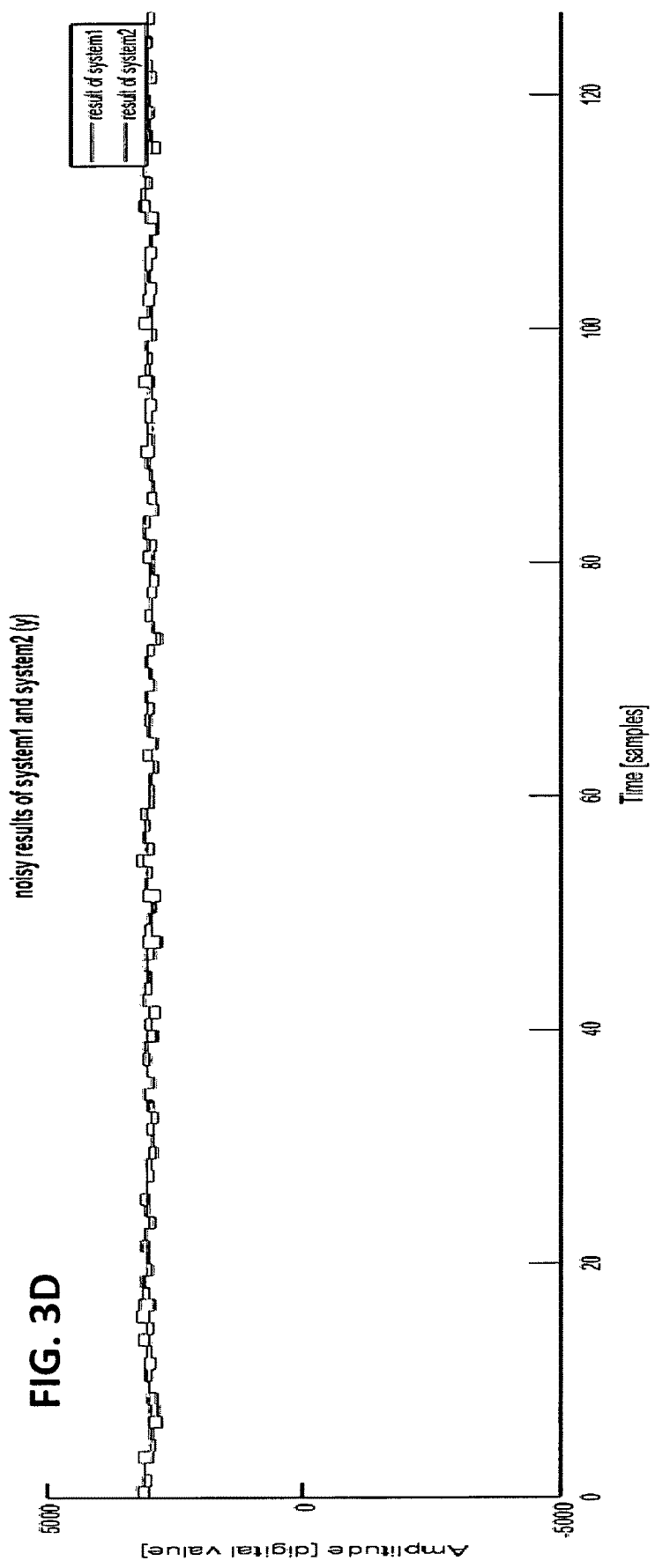
Figure 3E:
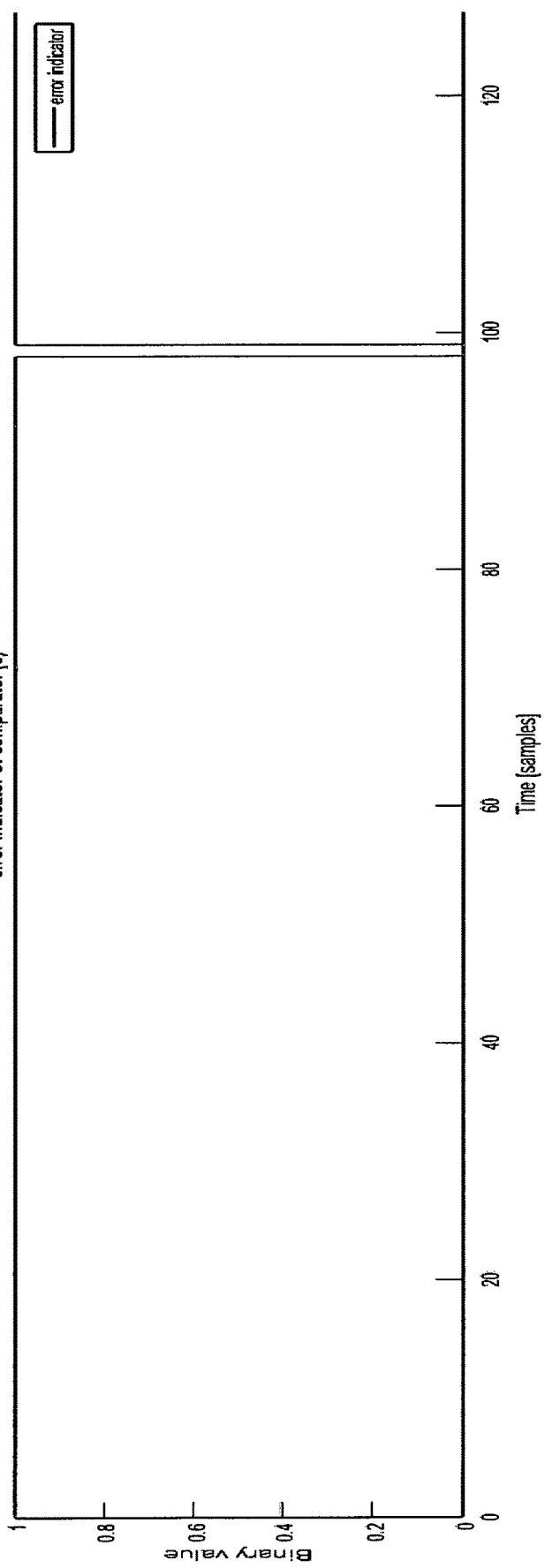

FIGS. 2A-2C show exemplary results for a safety mechanism system such the safety mechanism 100. For example, the system 110a of the safety mechanism 100 produces, in in response to some input, a digital or time sampled output as shown in the graph of FIG. 2A while the system 110b produces in response to some input, the digital or time sampled output as represented in the graph of FIG. 2B. The comparator 140 concurrently compares each the output or samples from the system 110a with the corresponding output samples of the system 110b. Since the output samples with index of 10 differ from each other, the comparator indicates an error or "1" output. The difference in the output samples with index 10 is considered as fault because both systems are expected to calculate equivalent functions. In all other cases the outputs of both systems are identical and therefore, the comparator does not indicate an error.

However, this approach has limitations, in particular when either the inputs of the system 110a and the system 110b differ, the systems 110a and 110b do not have the same transfer characteristics, e.g., do calculate exactly the same functions. For example, such a case may occur when an analog component is involved or included in a system. One such example is when each system in a duplication and comparison safety mechanism includes an analog to digital converter (ADC). Due to several effects such as, e.g., variances in manufacturing, any kind of noise effects, temperature dependencies, etc. there is a high probability that the respective ADC results will differ from each other even though they were not affected by a fault. A simple digital comparator will not differentiate between fault and noise and instead will just check for the equality of the results of the systems. The effect of this limitation is that the comparator produces or outputs an incorrect error indication.

This problem is shown in FIGS. 3A-3E where system 110a and system 110b of the safety mechanism 100 may implement or be designed to implement a same linear analog to digital conversion function which converts input voltages x to digital number representations y. In the example for FIGS. 3A-3E, the function f for each system may be defined by the relationship:

$$y=f(x)=1000*x*r$$

where r represents the random noise assumed to be introduced by each system individually due to the aforementioned effects.

In such a case, the system 110a may not implement exactly the same function as system 110b because the noise for each system would not be the same (e.g., because $r_{system1} \neq r_{system2}$). It can be expected that the noise differences are in an acceptable range for the application. However, since the comparator 140 cannot tolerate the noise, the comparator 140 generates false error information whenever the digital result codes of both systems are not identical. In FIGS. 3A-3E, only the digital outputs with index 98 match each other. That is, for such an application the basic concept of duplication and comparison is not practical.

Figure 4:
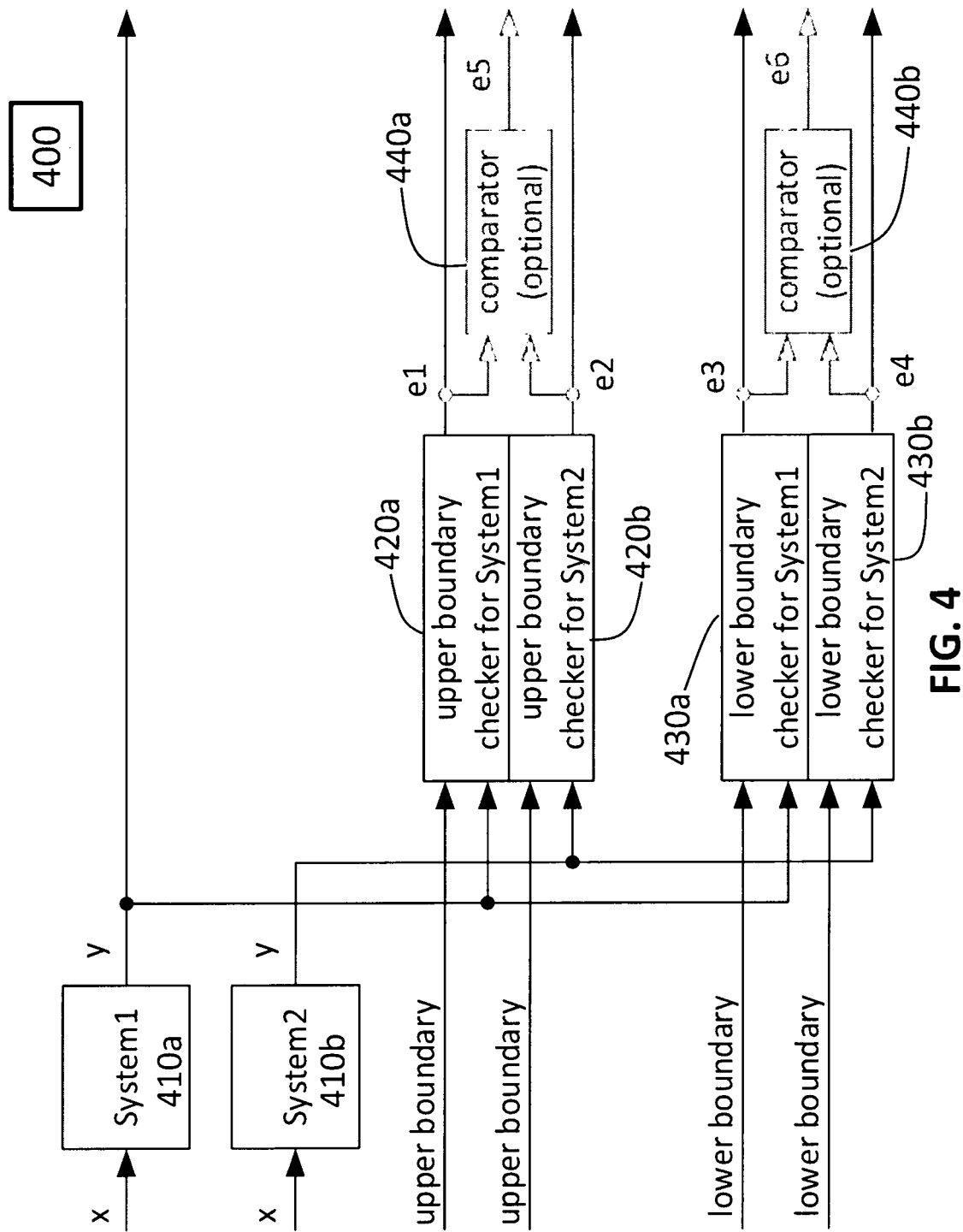
FIG. 4 shows a safety mechanism.

FIG. 4 shows another type of safety mechanism 400. The safety mechanism 400, like the safety mechanism 400, includes two systems, system 1 (410a) and system 2 (410b). However, the system architecture for the safety mechanism 400 includes upper boundary checkers 420a and 420b and lower boundary checkers 430a and when 430b. The upper boundary checker 420a and the lower boundary checker 430a are boundary checkers for the system 410a, while the upper boundary checker 420b and lower boundary checker 430b are boundary checkers for the system 410b. These boundary checkers implement the following functions:

$$f_{upper\ boundary}(x) = \begin{cases} 1, & \text{if } y \text{ of System 1} > \text{upper boundary} \\ 0, & \text{otherwise} \end{cases}$$

$$f_{lower\ boundary}(x) = \begin{cases} 1, & \text{if } y \text{ of System 1} < \text{lower boundary} \\ 0, & \text{otherwise} \end{cases}$$

In contrast to a simple comparator, such boundary checkers may tolerate noise as long as the output or results are within the boundaries. That is, it can be expected that the results are not affected by a fault or that the affecting fault can be tolerated because it vanishes in the noise floor. If the corresponding application is robust enough, such a limitation of the fault model will be acceptable since it has no relevant effect.

While in mechanisms such as safety mechanism 400, various implementations are possible e.g., for example, the error signal can be directly generated from the boundary flags e1, . . . , e3 if any of the results exceeds the defined range. The comparison of the boundary flags may be useful in order to detect if only one of both systems exceeded a certain boundary (see the optional comparators 440a, 440b in FIG. 4 with their corresponding error indicators e5 and e6). However, due to noise this optional feature might require a quite precise setup of the boundaries with respect to the measured signal.

Figure 5A:
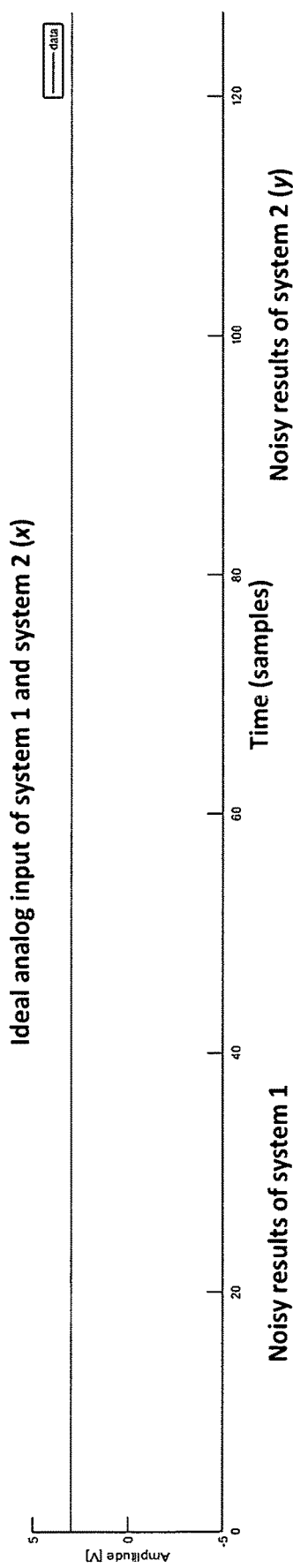
FIGS. 5A-5G, FIGS. 6A-6G, FIGS. 7A-7G, and FIGS. 8A-8G include graphs of simulated inputs and results for the safety mechanism of FIG. 4.

The example depicted in FIGS. 5A-5G illustrate the concept of duplication with boundary checking according to the safety mechanism 400 of FIG. 4. In this case, the upper boundaries are configured with the value 3500 and the lower boundaries with the value 2500. FIG. 5A shows an ideal constant input (x) of 3 volts that is applied to both systems 410a and 410b of the safety mechanism 400. The systems 410a and 410b are configured to or designed to realize the function $f(x)$ (in volts)=1000*x*r with $r_{system1} \neq r_{system2}$.

Figure 5B:
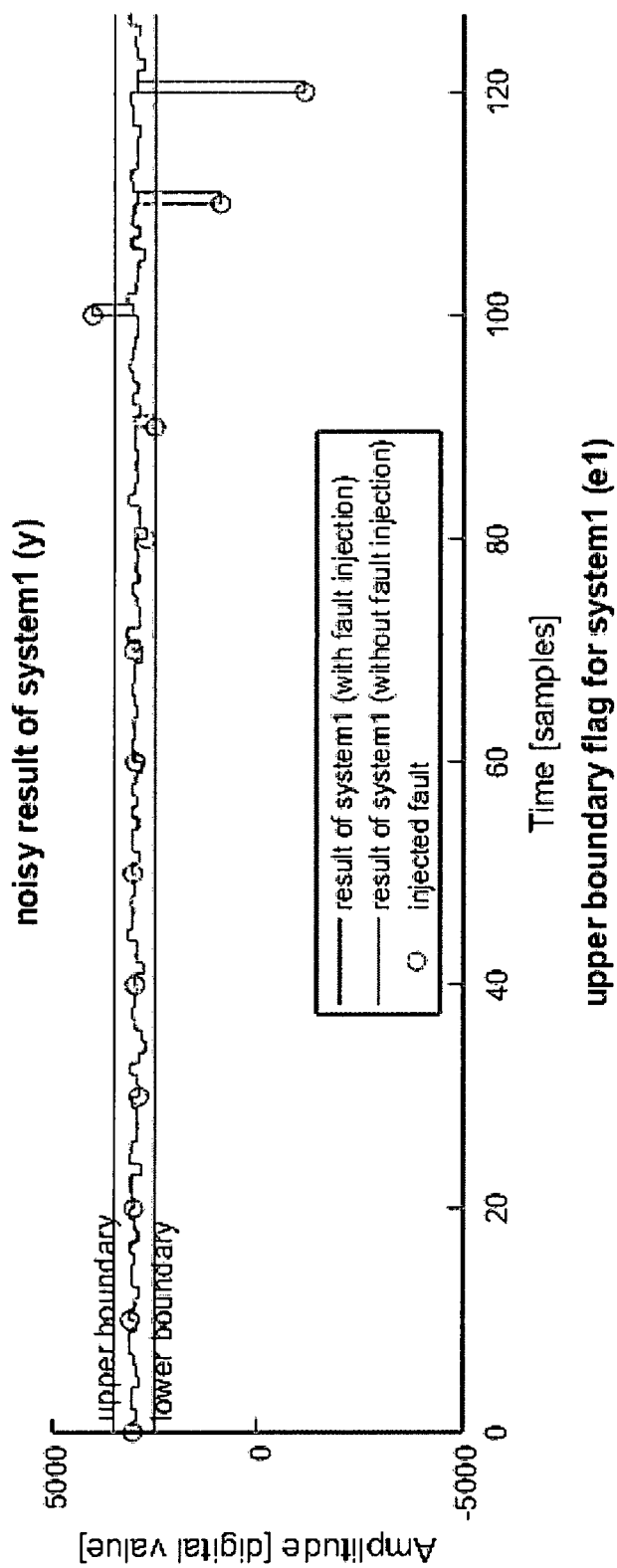
Figure 5C:
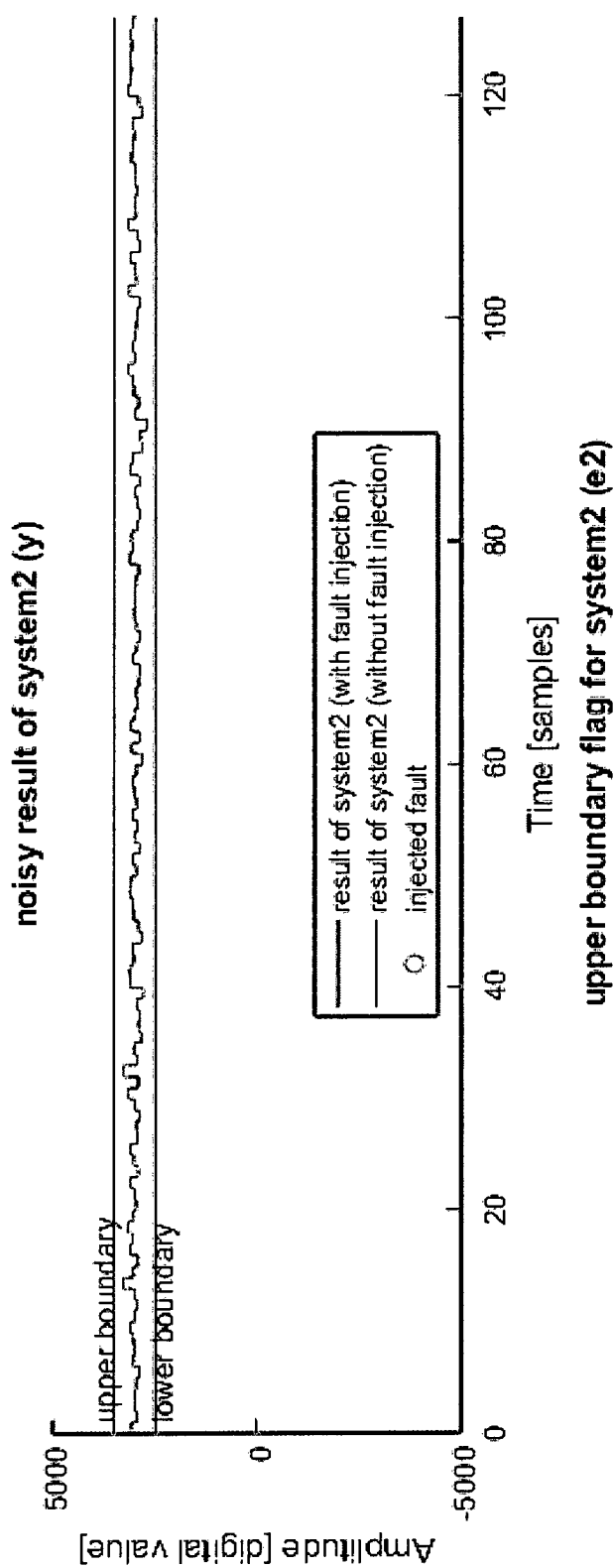
Figure 5D:
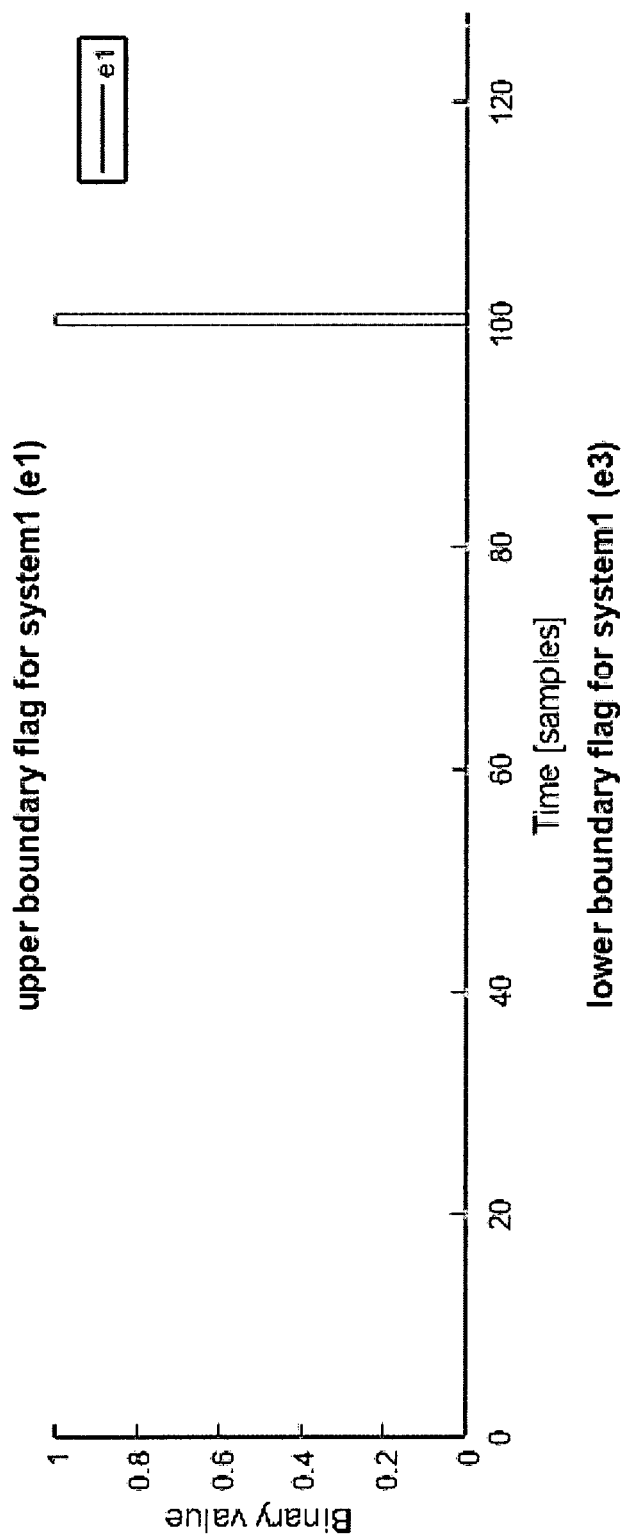
Figure 5E:
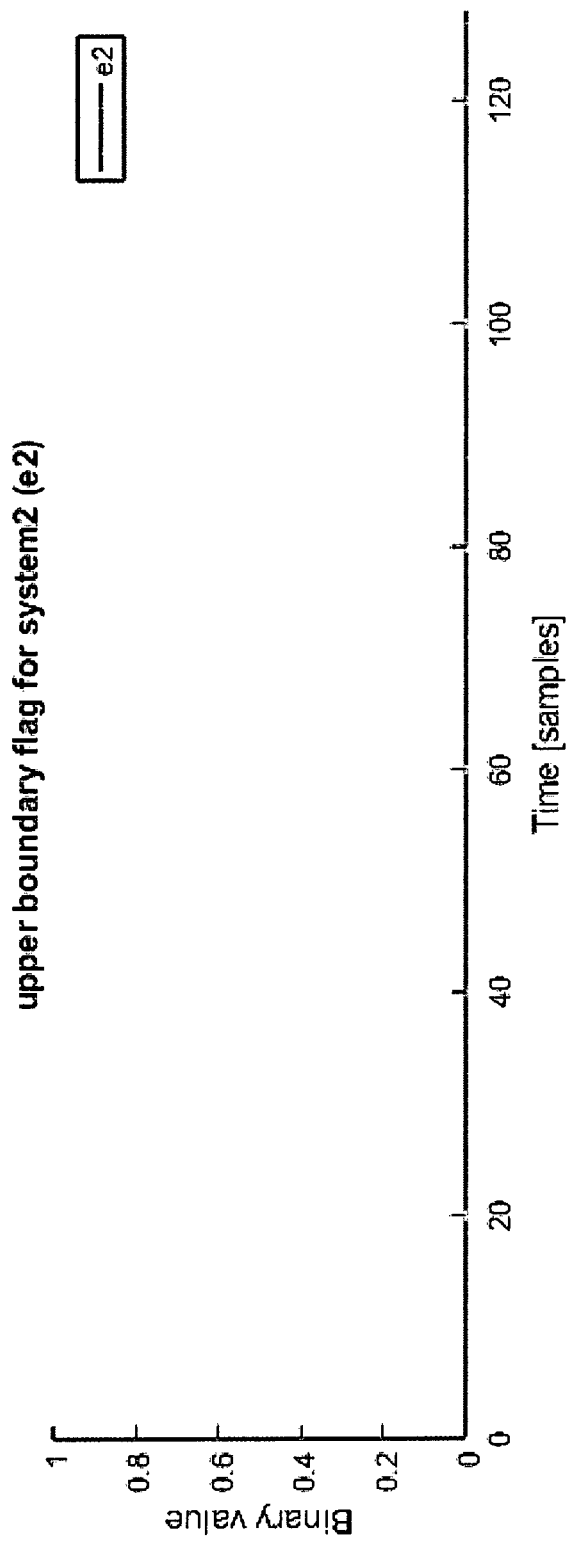
Figure 5F:
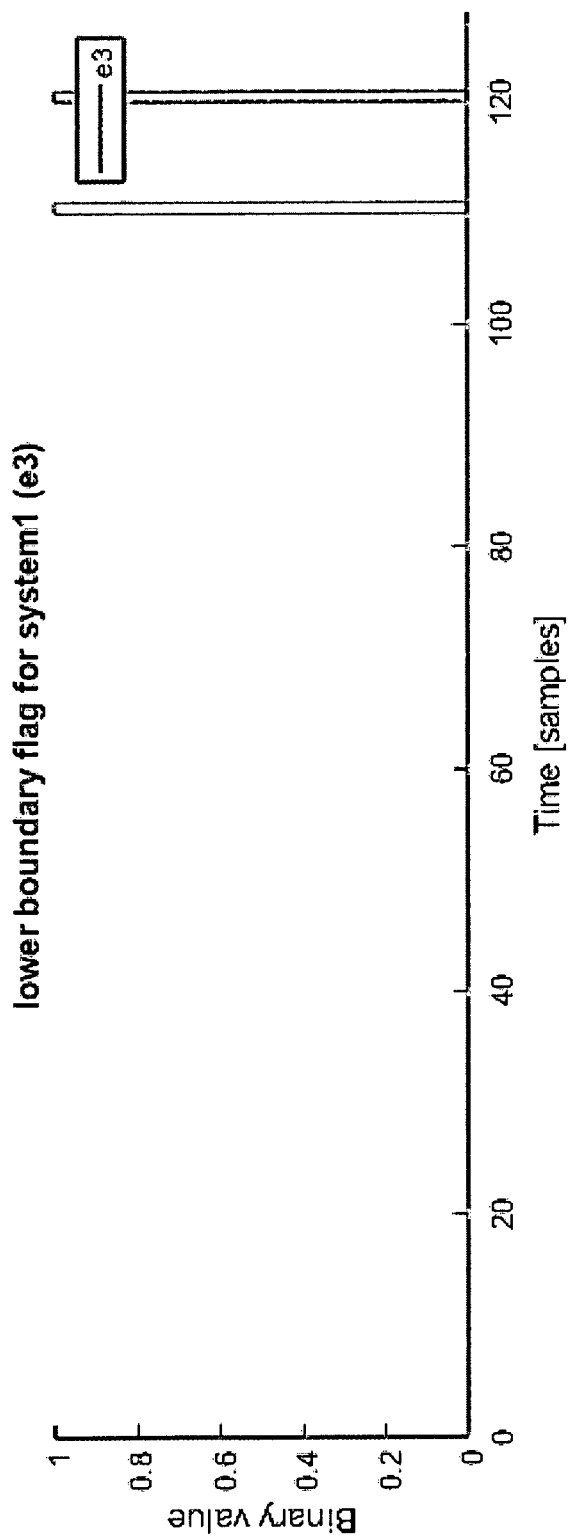
Figure 5G:
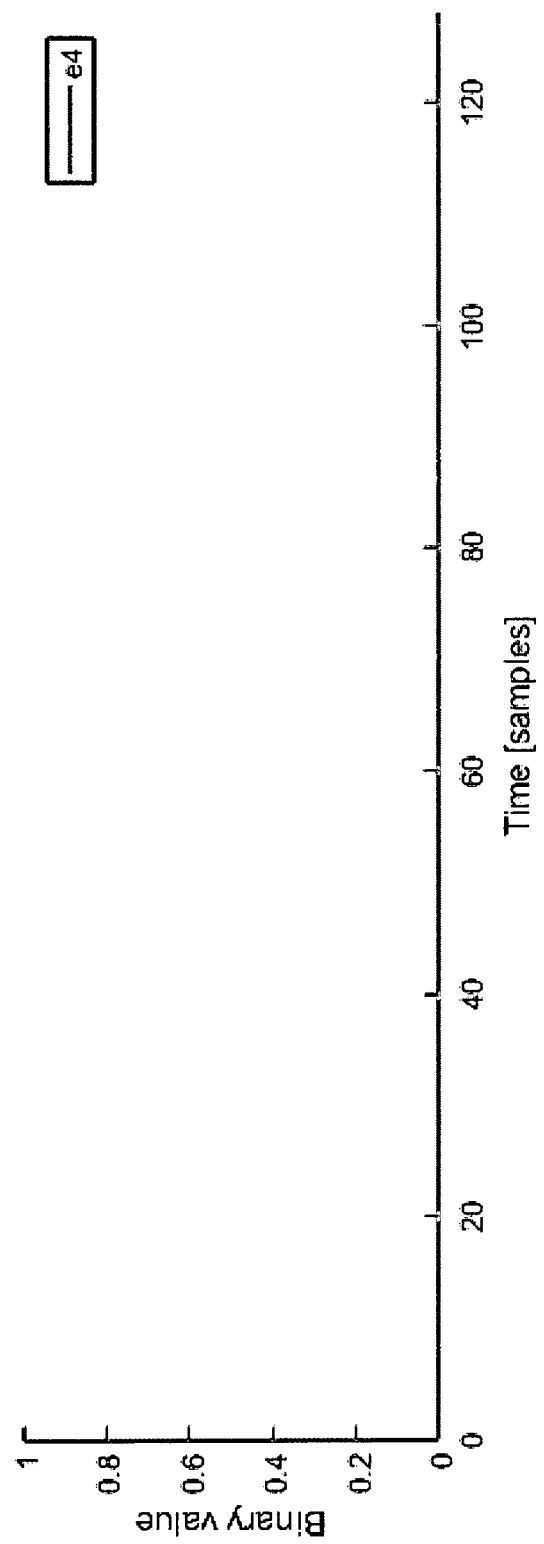
Figure 6A:
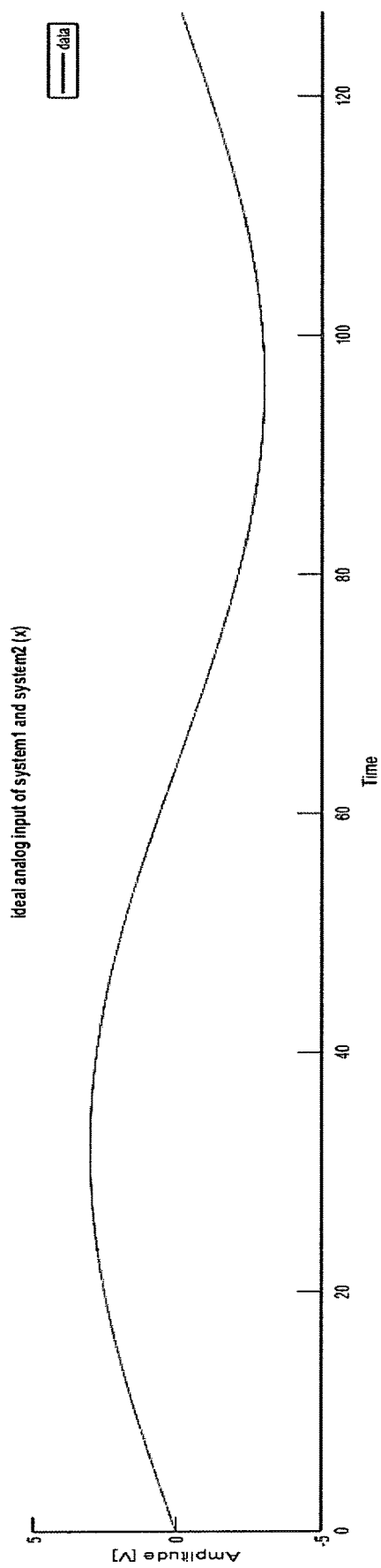
Figure 6B:
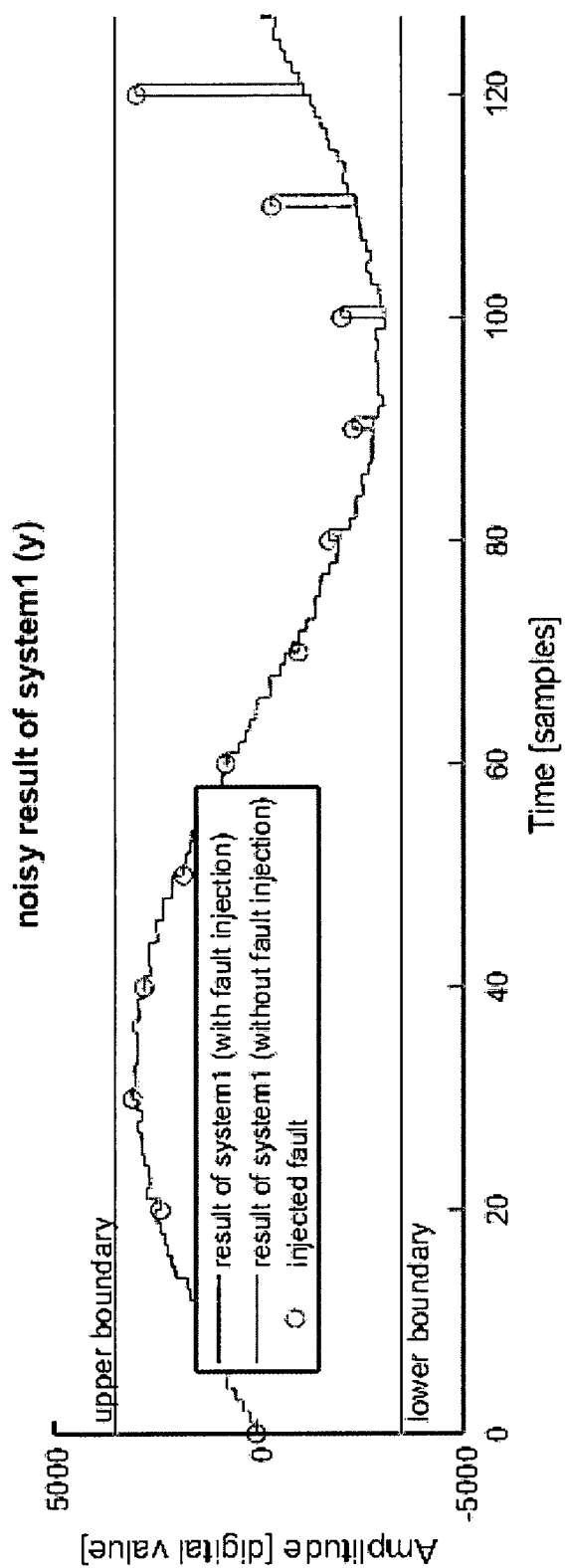
Figure 6C:
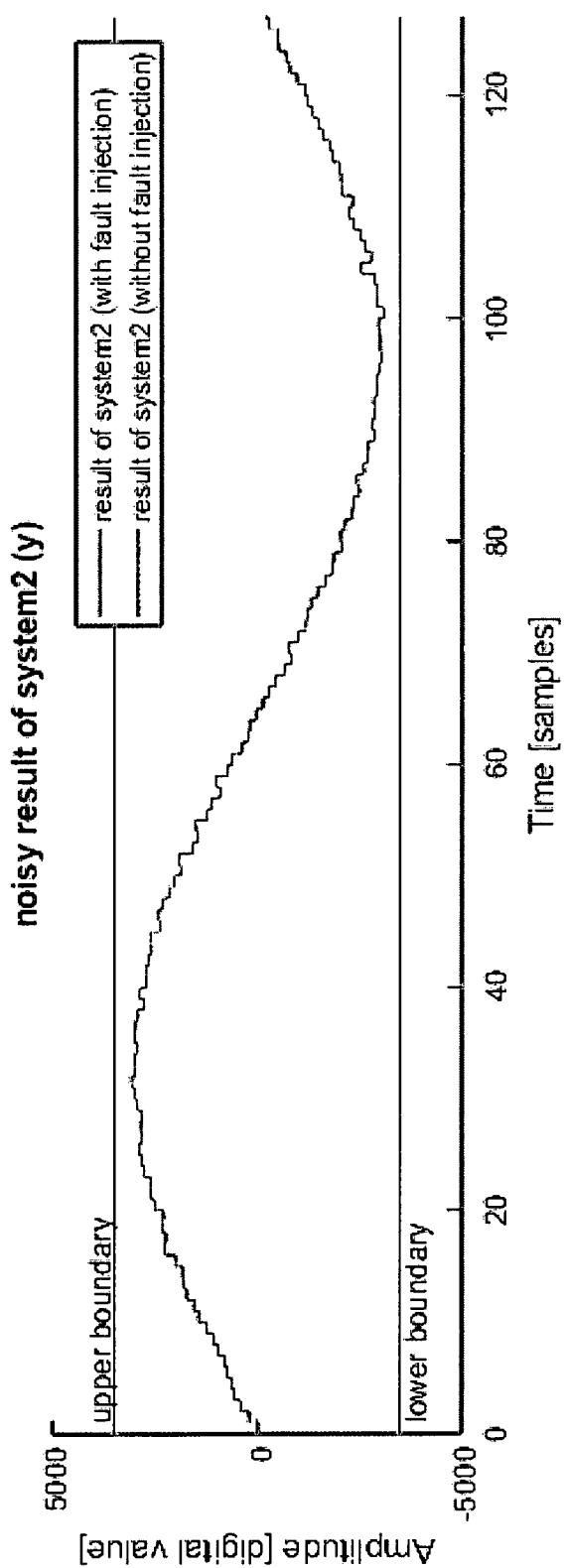
Figure 6D:
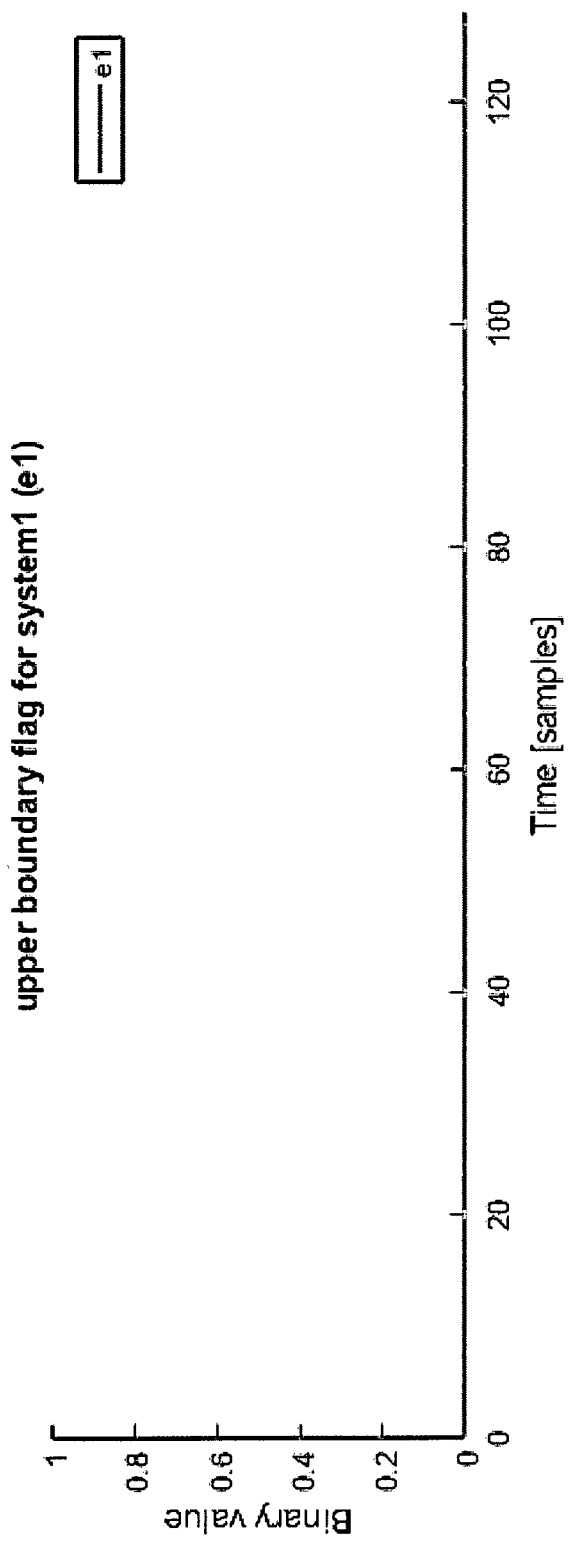
Figure 6E:
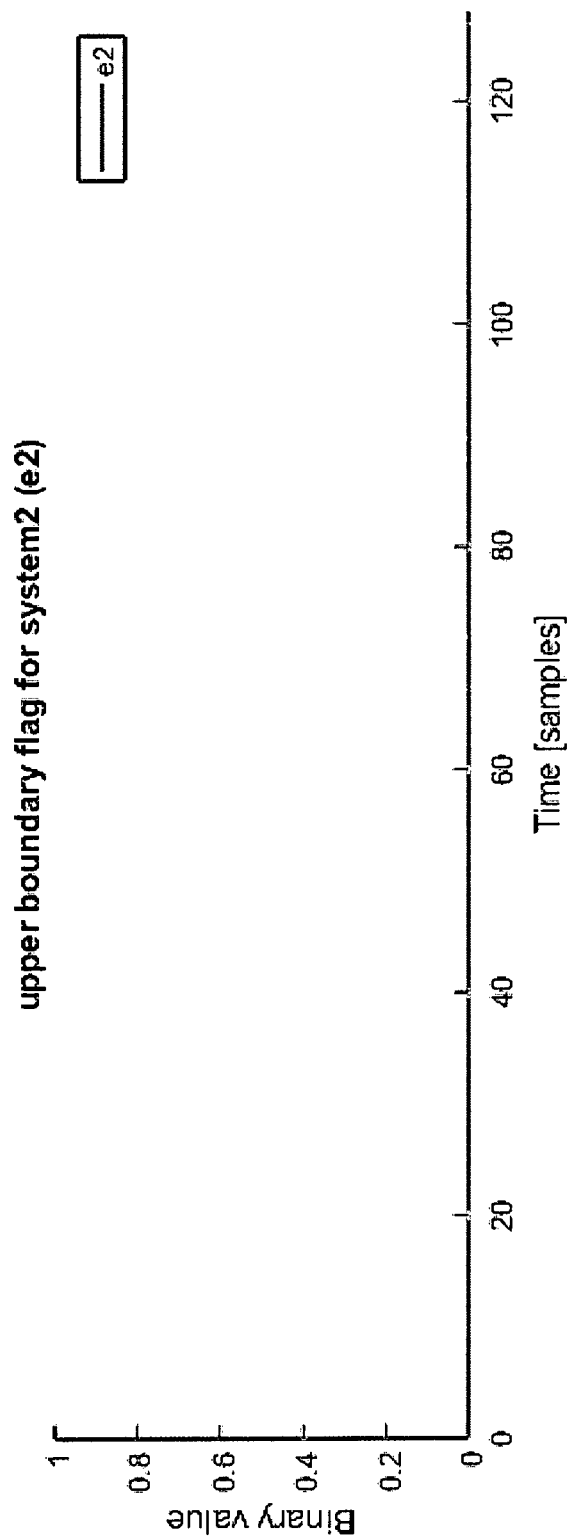
Figure 6F:
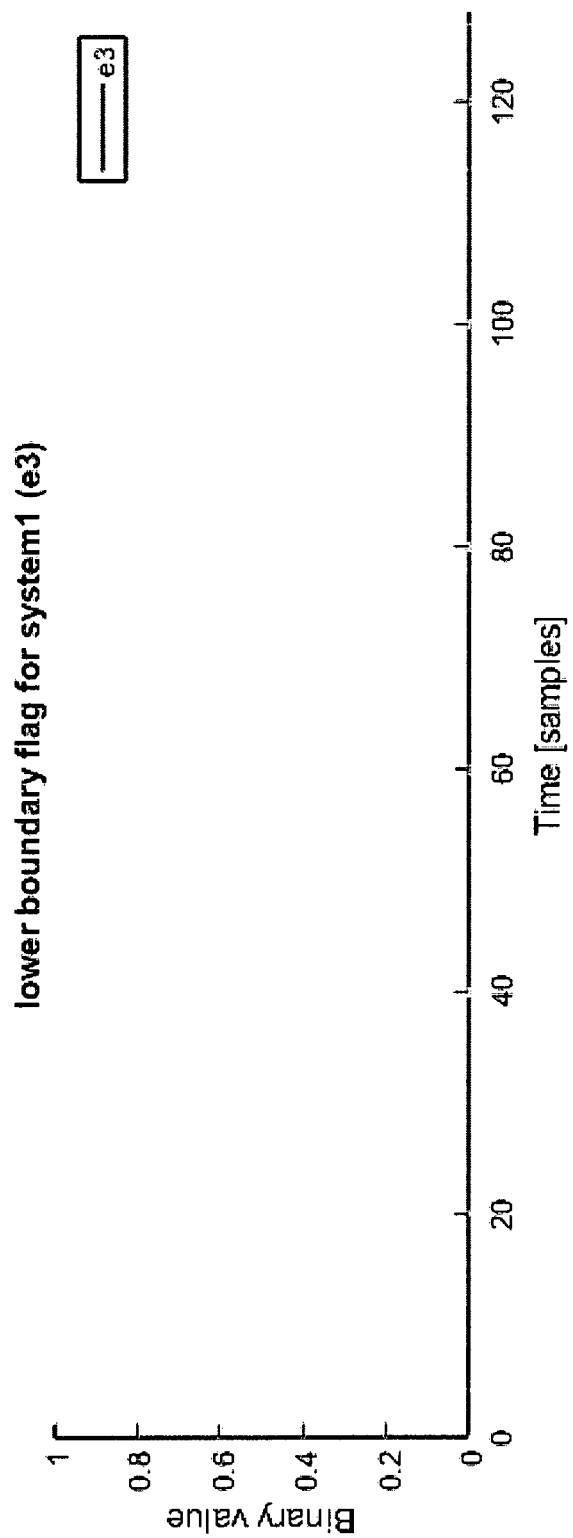
Figure 6G:
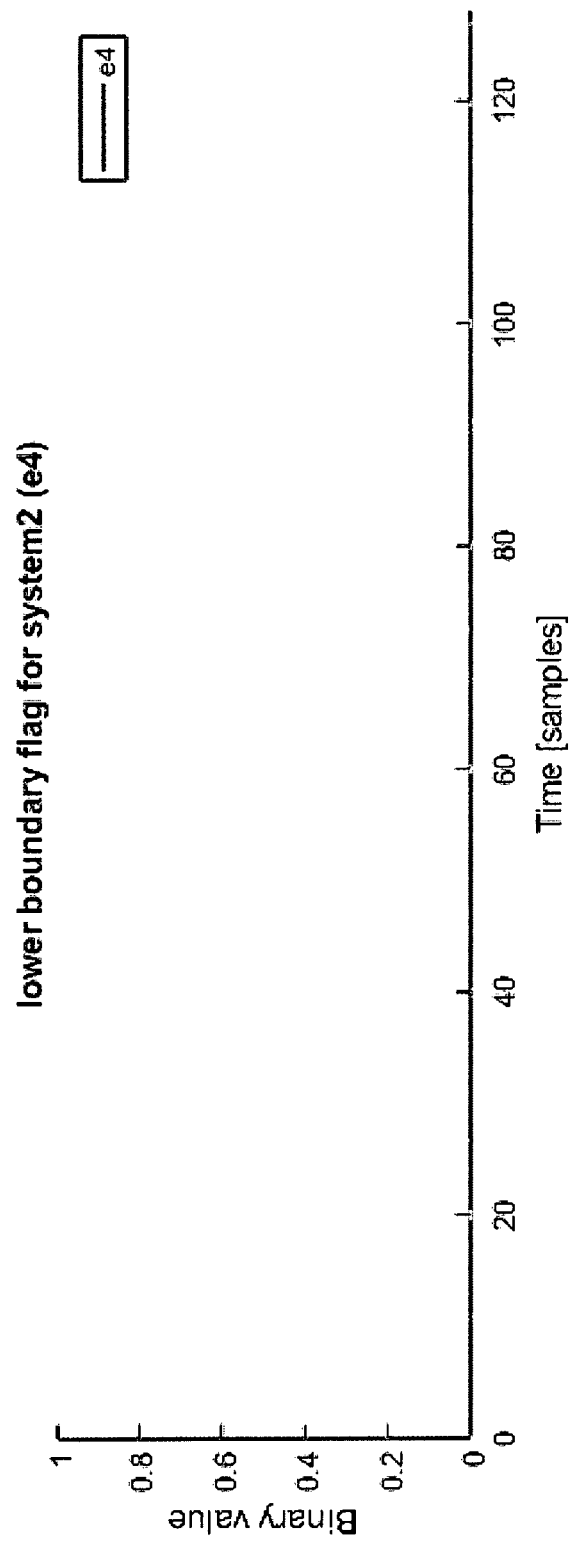

The graphs of FIGS. 5B and 5C show the respective output or results from system 410a and 410b. As indicated in FIG. 5B, faults are injected on the two's complement representation of the results of system 410a. The fault injection was implemented in a way so that the first fault was injected on the least significant bit (LSB) of the result, the second one on position LSB+1 and so on. The graphs of FIGS. 5D-5G respectively show the output signal, e.g. boundary flag error signals for the checkers 420a-d based on the graphs of FIGS. 5A-5C.

In some cases, an application may be able to tolerate the first 10 faults because only results which exceed the boundaries of one of both systems are considered to be relevant. Such faults also decrease the signal to noise ratio (SNR) of the measurement result but it depends on the sensitivity of the application and the frequency of occurrence if the effect on the result will still be in an acceptable range. However, with respect to the boundary setup the effect of the remaining faults is too big because they change the result values so that they exceed the predefined boundaries of system 1 only and therefore, they must be indicated as errors.

For the example of FIGS. 5A-5G, the expected range of the input signal must be known and configured in advance. For slowly changing signals, this becomes problematic because the user might either have to adapt the boundaries continuously or define a wider measurement tolerance range. There are drawbacks for both solutions. The continuous reconfiguration of the boundaries limits system resources and might be impractical in real-time applications. This is especially true for quickly or unexpectedly changing input signals e.g., high frequency sinusoidal waves or non-periodic waveforms. In some cases, it might not be possible to continually or continuously reconfigure. Further, time-shifting result checking against a reference value limits system resources and the range increase has the problem that it further restricts the fault model.

Such limitations of the safety mechanism 400 is shown the graphs of FIGS. 6A-6G. That is, the example of FIGS. 6A-6G implements the same concept for the example of FIG. 5, except the ideal constant input of 3 volts (FIG. 5A) was replaced by an ideal sine wave with an amplitude of 3 volts (FIG. 6A) and the lower boundary was adapted from 2500 to −3500. Since the boundary change widens the measurement tolerance range now from 1000 to 7000 codes, not even the fault on the sign bit at the output sample with index 120 is detected anymore. The graphs of FIGS. 6D-6G do not show any detected errors or error signals generated.

Figure 7A:
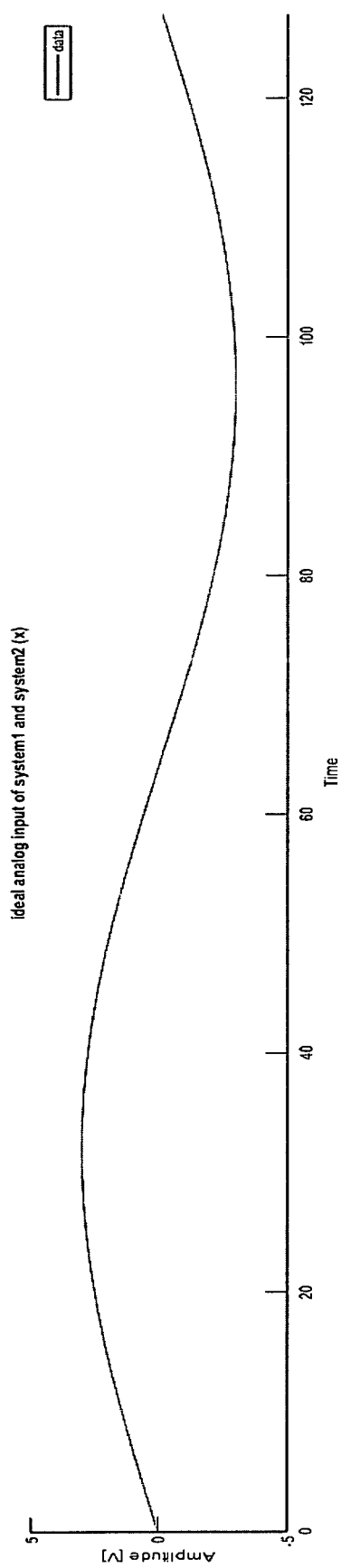
Figure 7C:
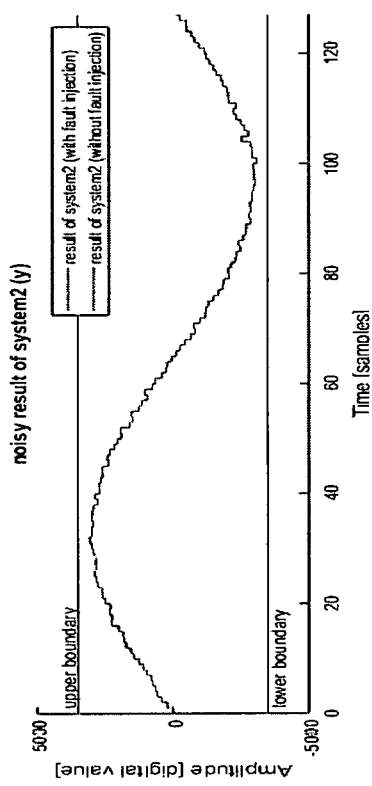
Figure 7B:
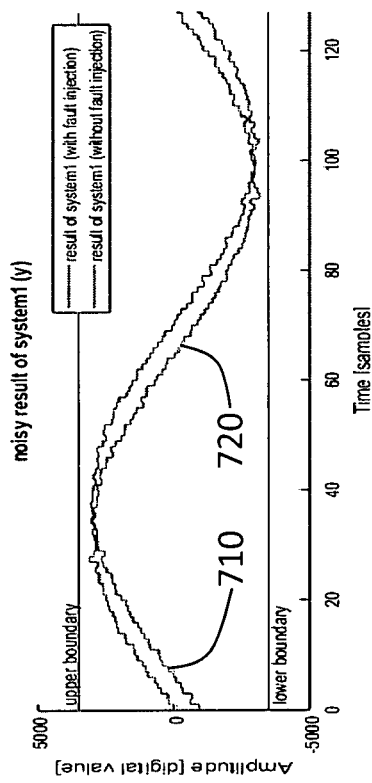
Figure 7E:
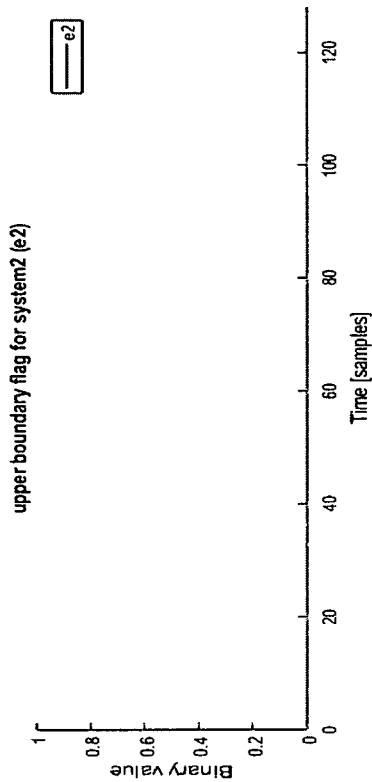
Figure 7D:
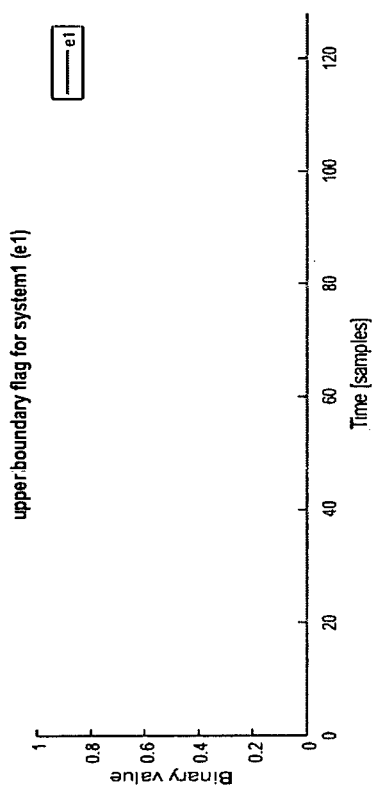
Figure 7G:
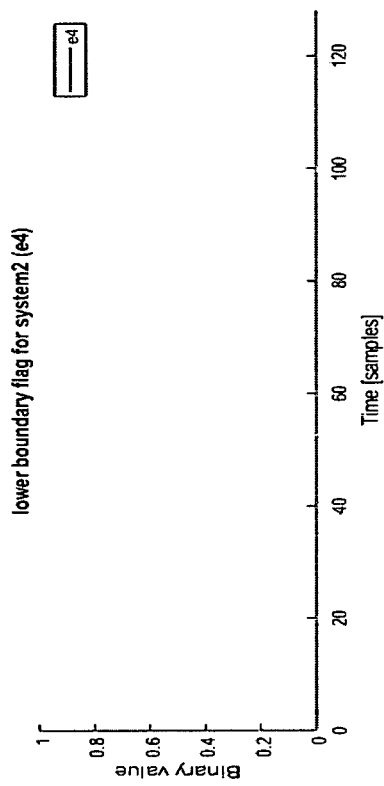
Figure 7F:
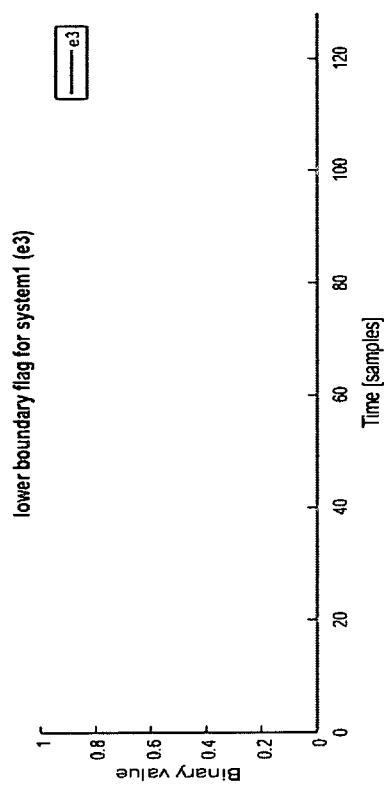

Other types of faults such as, for example, faults affecting the phase or the frequency of a sinusoidal wave will also not be detected by a safety mechanism such as safety mechanism 400 as illustrated by the graphs of FIGS. 7A-7G. Thus, FIG. 7B shows a simulated result of system 1 including fault injection 710 and the result of system 1 without fault injection 720. In FIG. 7C, the results for both system 2 with or without fault injection are the same. The graphs of FIGS. 7D-7G show that phase errors from the system 1 (FIG. 7B) are not detected.

Figure 8A:
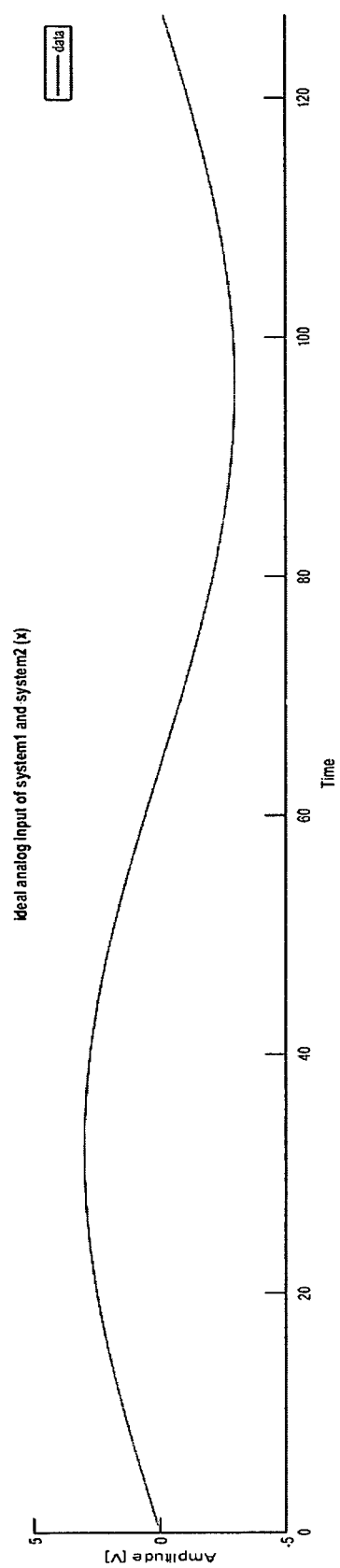
Figure 8C:
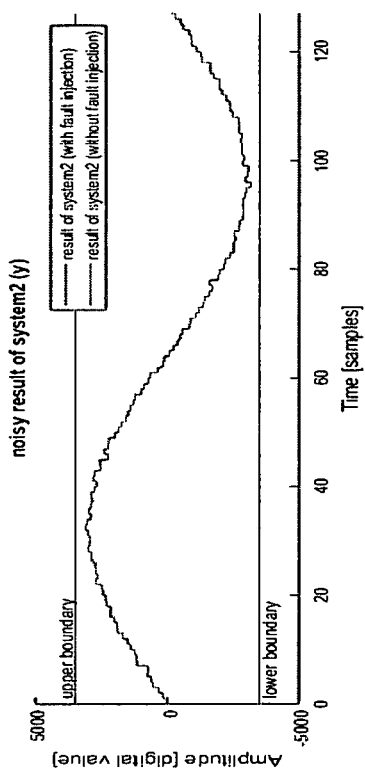
Figure 8B:
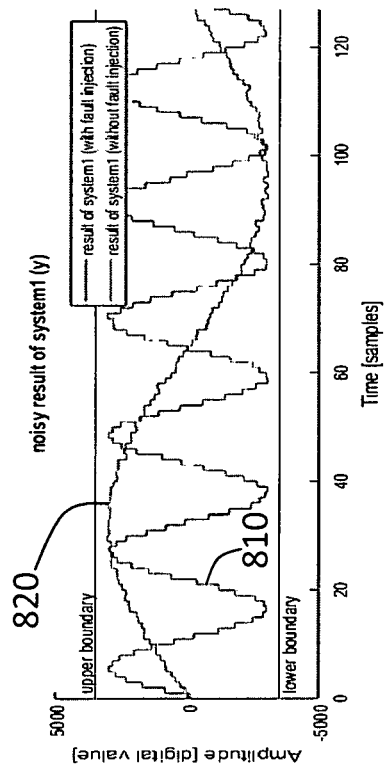
Figure 8E:
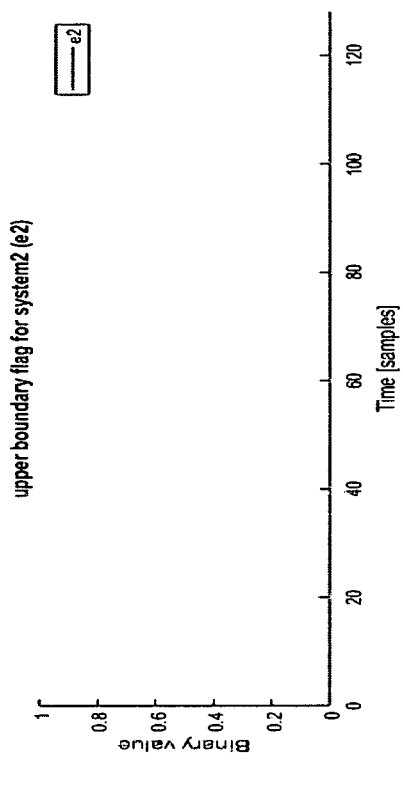
Figure 8D:
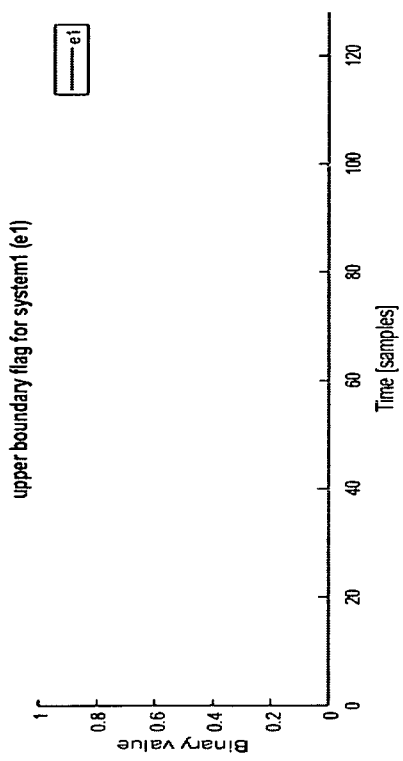
Figure 8G:
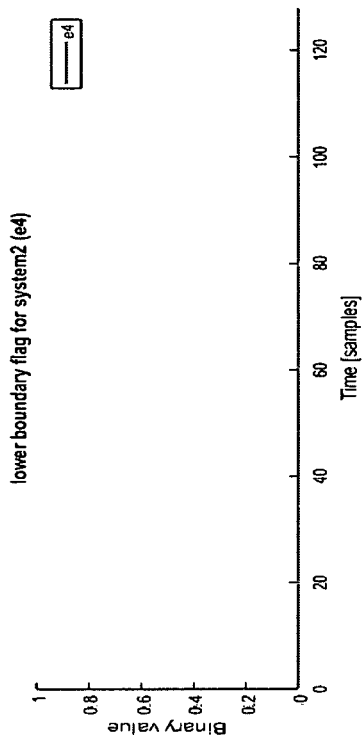
Figure 8F:
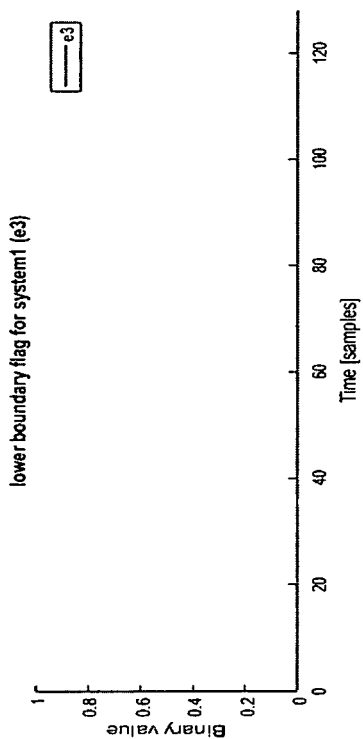

Similarly, FIGS. 8A-8G show how the safety mechanism 400 will also fail to detect frequency errors introduced by system 1 (FIG. 8B). Output 801 is the result with error e.g., frequency error from fault injection while output 820 is the result with no error or no fault injection. The output of system 2 with or without fault injection is the same for this example as shown in FIG. 8C. Further as shown in the graphs of FIGS. 8D-8G, safety mechanisms like safety mechanism 400 fail to indicate an error because the considered fault model does not cover these kind of faults. Instead it can only detect certain amplitude and offset errors.

A second system may be useful when also the input signal x shall be monitored, and the input x of second system can be connected to a different source so that it serves as reference for first system (e.g., system 1). Comparison of the error indicators can provide useful information if system 1 and the inputs of system 1 behave like or close enough to system 2 and the inputs of system 2. However, in order to check only that System 1 and its inputs do not exceed the defined boundary System 2 may not be necessary.

Figure 9:
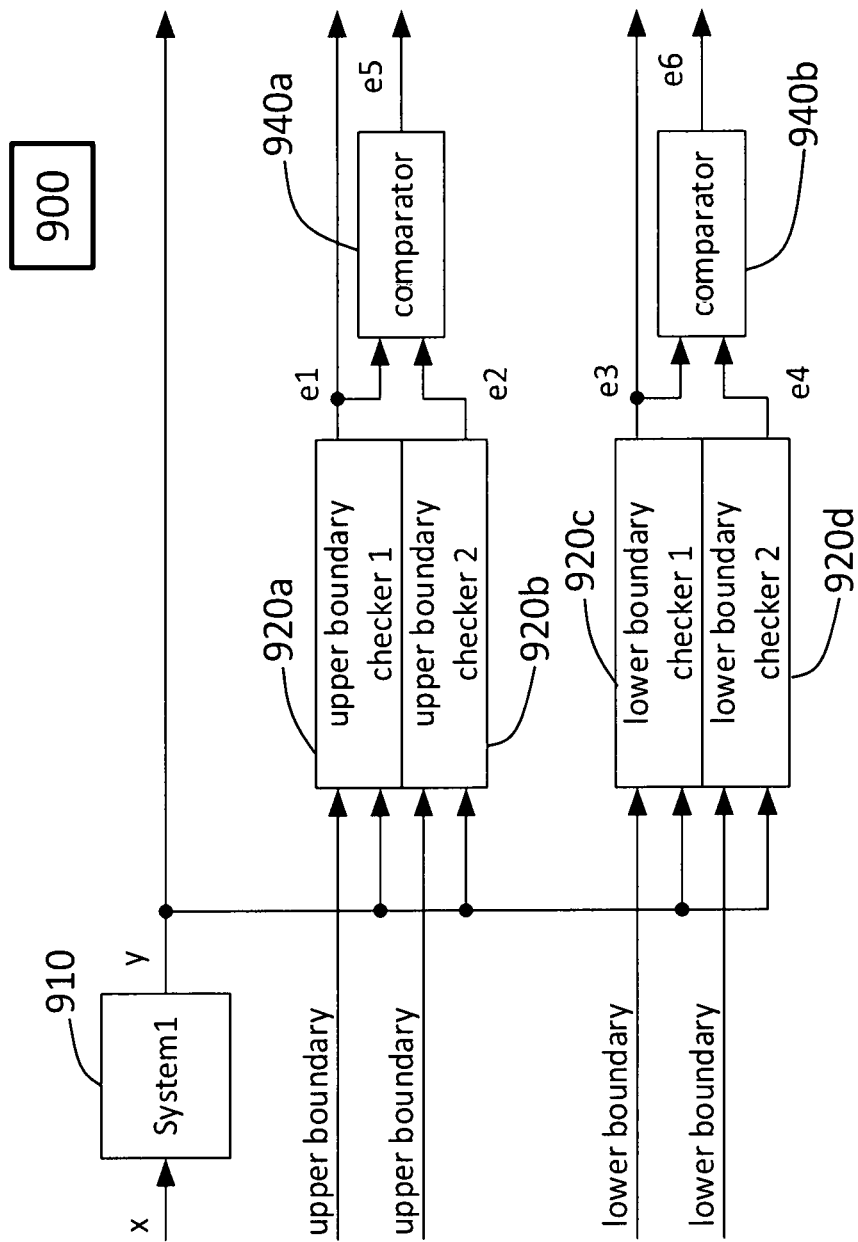
FIG. 9 shows a safety mechanism.

FIG. 9 shows another safety mechanism 900 that does not include a second system in addition to the first system 910a and instead implements only duplicated boundary checking. An example for the functionality of the circuit arrangement according to FIG. 9 is shown in the graphs of FIGS. 10A-10F. The safety mechanism 900 is to designed to detect if a fault in system 1 (910) or in it's the inputs to system 1 propagate to the output of system 1 by detecting whether the resulting output exceeds an expected measurement range. In error-free cases the boundaries are not exceeded, neither due to the input nor due to transfer characteristics of system 1. Additionally, every fault in the boundary checkers which could cause false error indication can be detected.

Figure 10A:
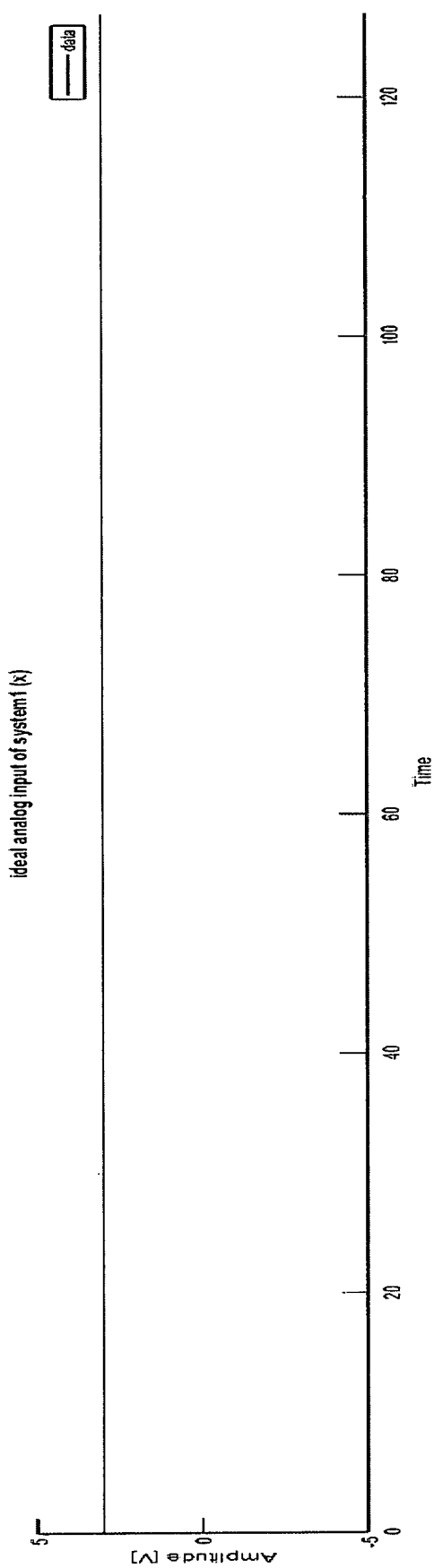
FIGS. 10A-10F include graphs of simulated inputs and results for the safety mechanism of FIG. 9.
Figure 10B:
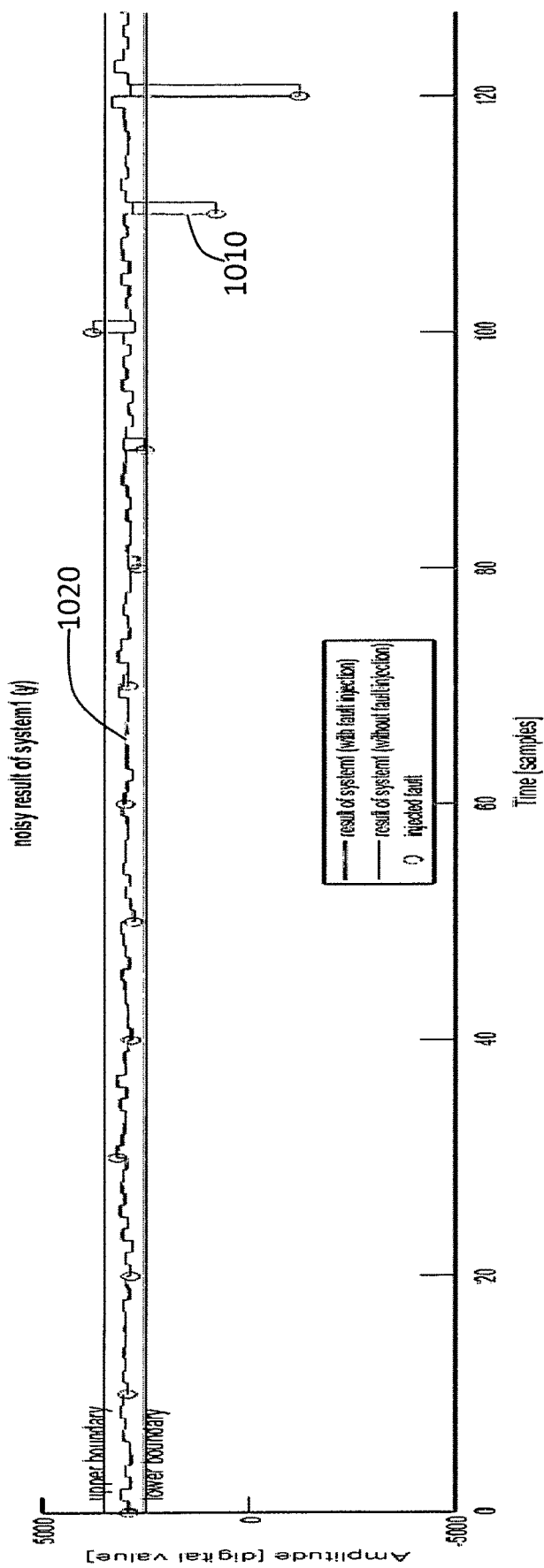
Figure 10D:
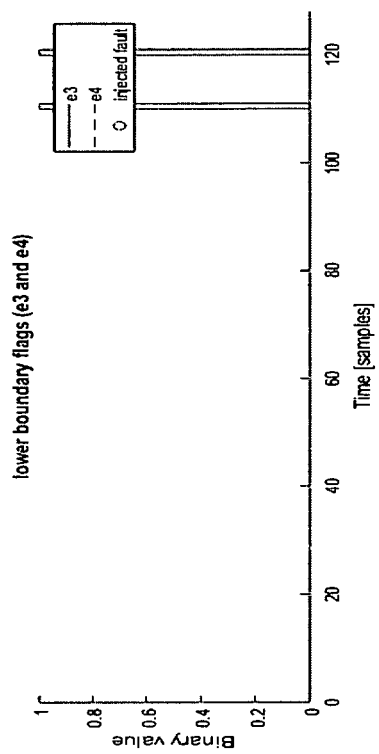

In the context of FIGS. 10A-10F, the setup with respect to system 1 (910), the inputs and the fault injection is implemented as in the example shown in the graphs of FIGS. 5A-5G for the safety mechanism 400. In FIG. 10A, 1010 represents the output of system 910 that has fault injection (errors) while the output 1020 represents the output of system 910 without errors. Further, fault detection indicated by the boundary flags from the boundary checkers 920a-d and the upper and lower boundary comparators 940a, b work similarly as the corresponding components of FIG. 4. However, unlike the safety mechanism 400, the safety mechanism 900 finds or detects a fault at the result with index 90. This fault is due to the random noise introduced by system 1 which leads in the example for FIGS. 10A-10F to a digital result value is closer to the lower boundary than in the example of FIGS. 5A-5G.

Figure 10C:
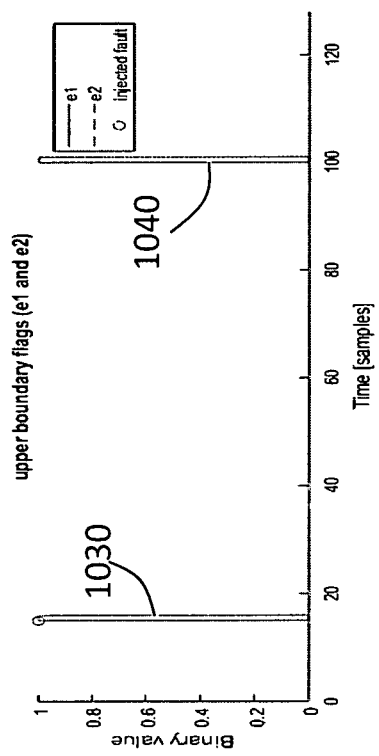
Figure 10E:
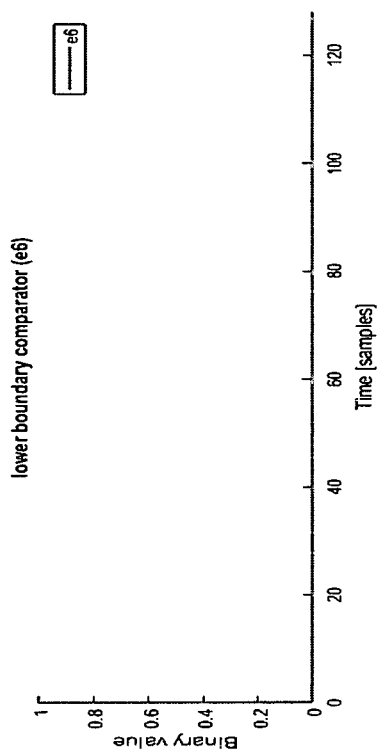
Figure 10F:
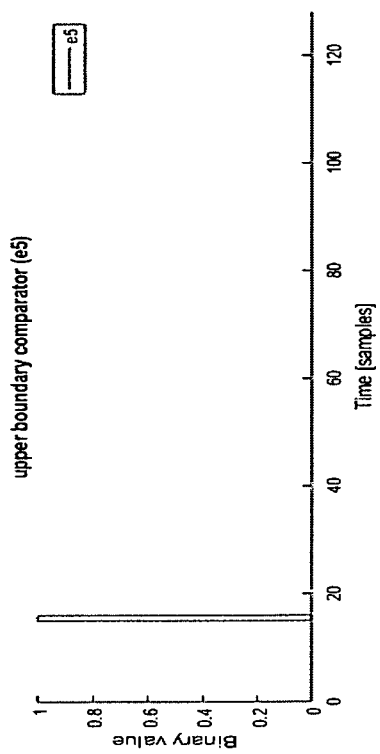

As shown in FIG. 10C, in addition to the fault injection occurring in system 1 (910), a fault was also injected in the upper boundary checker 1 920a so that the boundary flag e1 provides wrong information at position 15 (1030). This error is detected by the upper boundary comparator 940a and reported by the error indicator e5 as shown in FIG. 10E.

The previous examples show that for safety mechanism or arrangements including duplicate systems (a system 1 and a system 2), where the functions of system 1 ($f_{system1}$) and System 2 ($f_{system2}$) are not completely equivalent e.g. such as when an analog component is involved, that:
  duplication and comparison is not suitable for error detection
  boundary checking is limited to being useful to detect faults when the inputs are more or less constant or only amplitude and offset of a signal shall be monitored but the fault model is limited
  boundary checking is not suited when the inputs are changing over time, the range of the input is not predictable or too big and when phase or frequency of a signal shall be monitored.

Figure 11:
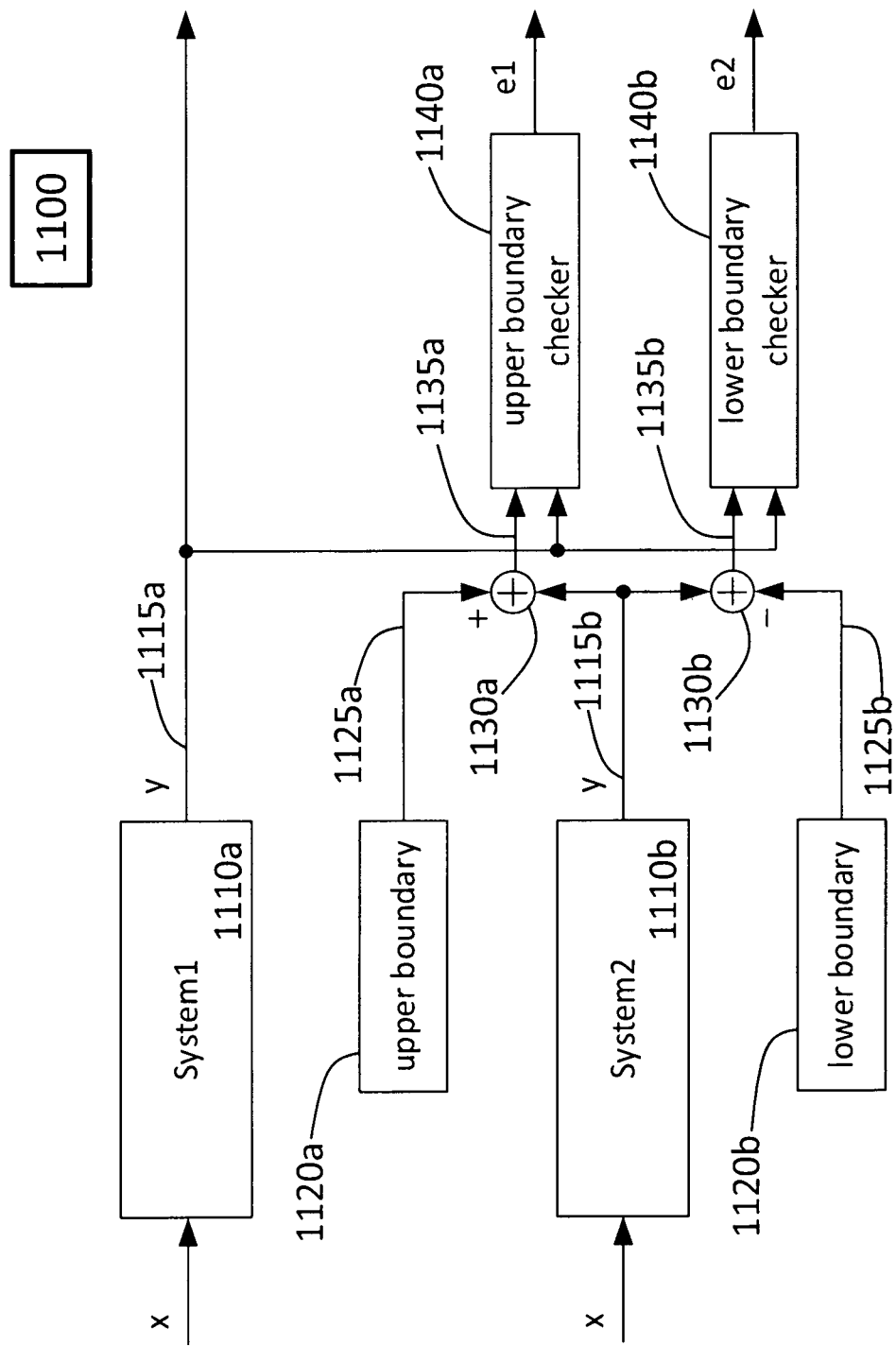
FIG. 11 shows a safety mechanism according to an exemplary embodiment of the present disclosure.

FIG. 11 shows an exemplary safety mechanism circuit arrangement 1100 according to an exemplary embodiment of the present disclosure. The safety mechanism circuit arrangement 1100 may include at least two systems, system

1110a (System 1) and 1110b (System 2). Each system may include an electronic path that includes at least one electronic component, e.g., an electronic device. For example, the electronic component may at least include an analog component or device, such as, e.g., an analog-to-digital converter (ADC) and/or include a digital component or device. That is, the electronic path may be only digital, only analog, or a combination of digital and analog components/devices.

In various examples, each of the systems 1110a, b may be designed to implement or realize a function, e.g., produce a certain output for a given input. In particular, each system may be designed or configured to implement or execute the same function, that is, configured to have the same transfer function characteristics. The systems 1110a and 1110b may each be designed or configured to produce the same or similar output (y) given in response to receiving the same input (x). The system 1110b may be a reference system for the system 1110a.

In some examples, the systems 1110a, b, may include the same components. That is, the systems 1110a, b may each have the same circuit arrangement, e.g., the same electronic path including the same or identical type of components or devices. In other cases, the systems 1110, b or the electronic path of each of systems 1110a, b or parts thereof may differ from each other. For example, the system 1110a may be an electronic path including one or more components while the second system 1110b may an electronic path including a different circuit arrangement (e.g., only a signal generator) that is designed to produce an output signal designed to mimic or be similar to the output of the first system 1110a.

In at least some exemplary embodiments system 1 (e.g., 1110a) may include an analog-to-digital converter (ADC). The ADC may be any suitable ADC, including, for example, a sigma-delta ADC. When the system 1 includes an ADC, the input to the system may be an analog signal while the output may be a digital signal.

Each of the systems 1110a, 1110b may output at least one digital or analog signal. Each of the output signals 1115a, 1115b, respectively from the systems 1110a, 1110b may be a continuous or continuing. That is, regardless of whether the output signal is a discrete/digital signal or an analog signal, the generated or output signal from each system 1110a, b may be continuous in the sense of being ongoing. In other words, the output signal may be produced in a continuing or persistent manner for at least a duration of time. Similarly, the input to each system 1110a, 1110b may also be either a digital or analog signal, and further may also be a continuous or continuing signal, or in other cases a one-time input signal.

Exemplary safety mechanisms of the present disclosure may be configured to describe or define a range or limits for an output signal or result. In the context of FIG. 11, the safety mechanism 1100 may include one or more sources for providing boundary offset values that can be used for configuring or generating boundaries. The example of FIG. 11 shows two boundary sources, an upper boundary source 1120a and a lower boundary source 1120b. The upper boundary source 1120a and the lower boundary source 1120b each may include a component or device, such as a register or other suitable device, that is configured to provide one or more boundary offset values as needed. While in the example of FIG. 11 the upper boundary source and the lower boundary source are shown as separate components, they also may be realized in other cases as a single component or device that provides both upper boundary offset values and lower boundary offset values.

The boundary sources 1120a and 1120b may provide static, predefined, or predetermined offset values. The provided boundary offset values may be configurable based on specified system or user input, and/or may vary over time, e.g., dynamically in response to certain identified parameters or input/feedback to the boundary sources. The output from such boundary sources may be realized digitally or as in analog form.

As shown in the example of FIG. 11, the output produced or generated by system 2 (1110b) is input into adder 1130a and into adder 1130b. Further, the upper boundary offset value 1125a output provided from the upper boundary source 1120a is also input into the adder 1130a, while the lower boundary offset value 1125b outputted from the lower boundary source 1120b is input for the adder 1130b. Thus, the adders 1130a, b add boundary offset values to the output of the system 1110b.

In FIG. 11, the adder 1130b, or another component not shown, may invert the lower boundary offset value provided by the lower boundary source 1120b. In other cases, the provided lower boundary offset value may be negative, or the lower adder 1140 be may invert the value from the lower boundary offset value, or the lower adder 1140 can be implemented as subtractor circuit to subtract the lower boundary offset value from the other input. The adder devices 1130a, b may be realized as digital devices and/or analog circuits depending on the suitability.

The effect of the adders 1130a, b is that the upper boundary value is combined with the output of system 2 (1115b), and the lower boundary value offset is separately combined with the output of system 2. Therefore, the adder 1130a generates or produces an output that represents an upper boundary, e.g., produces an output signal 1135a that defines an upper boundary. Similarly, the adder 1130b produces or generates an output that represents a lower boundary e.g., produces an output signal 1135b that defines a lower boundary.

In accordance with exemplary embodiments of the present disclosure, safety mechanisms may include a boundary check circuit or arrangement for determining whether an output signal fulfills certain criterion, e.g., boundary criterion. That is, such boundary checkers may determine whether an input signal is within one or more boundaries or defined limits, and may further produce a signal based on the determination.

The exemplary safety mechanism 1100, for example, includes an upper boundary checker 1140a and a lower boundary checker 1140b. These boundary checkers 1140a, b may be realized as any suitable device for respectively comparing the output signal 1115a from the system 1 (1110a) against the generated upper and lower boundary signals 1135a, 1135b. For example, the upper boundary checker 1150a and the lower boundary checker 1150b may each be realized as a comparator device. The upper boundary checker 1150a determines whether the input signal 1115a exceeds the generated upper boundary 1140a. The lower boundary checker 1150b determines whether the input signal 1115a exceeds the generated upper boundary 1140b. If the signal 1115a exceeds the upper boundary 1140a, e.g., if the upper checker 1150a determines that an amplitude of the signal 1115a exceeds a corresponding amplitude of the upper boundary 1140a, then then upper boundary checker 1150a produces an error signal e1. Similarly, if the signal 1115a falls below the lower boundary 1140b, e.g., if the lower boundary checker 1150b determines that an amplitude of the signal 1115a falls below a corresponding amplitude of the upper boundary 1140*b*, then the lower boundary checker 1150*b* produces an error signal e2.

Safety mechanisms such as the safety mechanism 1100 depicted in FIG. 11 solve the problem of continuous boundary adaption in the boundary checking. By using such safety mechanisms, a predefined reference value does not need be known in order to check the properties of a measured signal. This is because such safety mechanisms can continually or automatically produce dynamic or self-adapting boundaries. This approach solves the problems of the boundary checking concept with respect to changing or even unpredictable signals and improves the fault model while keeping the advantages of the boundary checking concept. Further, such safety checking mechanisms are also suited for real-time applications.

The safety mechanisms like safety mechanism 1100 address the problem of or need for continuous boundary adaption by adding the results of a second system (system 2) to boundary information (e.g., boundary offset vales). The effect is that the boundary input to the boundary checkers changes together with the results of system 2 because the boundary information is added to the output of system 2. More precisely, the boundaries being generated are now continuously recalculated on the basis of the outputs of system 2 and the offset values to dynamically define by the boundaries. In this way, upper and lower boundaries can envelop the output of system 1 (e.g., 1110*a*) with a defined range of measurement tolerance.

Of course, that due to noise of system 1 not being equal to the noise of system 2 (e.g., $r_{system1} \neq r_{system2}$) the boundaries can deviate from the ideal case. But if the shape of the input signal is known in advance, system 2 (1110*b*) may be realized as a digital signal generator so that every recalculated boundary is predictable. In general, the input of system 1 ($x_{system1}$) does not have to be the same input like ($x_{system2}$) especially if system 2 (e.g., 1110*b*) is implemented differently than system 1 (e.g., 1110*a*). Furthermore, fixed boundaries can be configured or realized by simply disabling system 2 or masking its outputs.

Figure 12A:
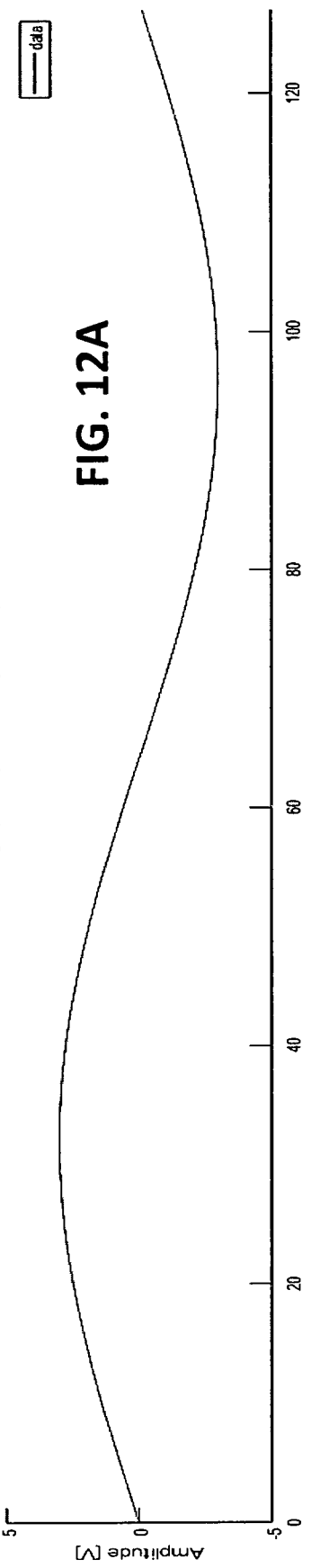
Figure 12B:
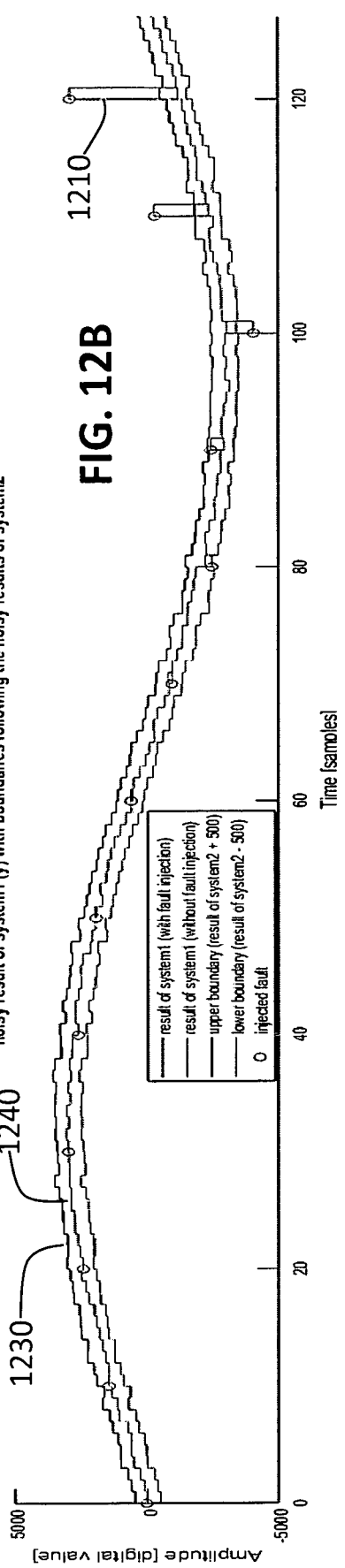

FIGS. 12A-12D include graphs illustrating the functionality of the safety mechanism 1100. As shown in FIG. 12A, an ideal sinusoidal wave with an amplitude of 3 volts may be applied to system 1 and system 2. The system 1 and system 2 may convert this analog input signal x to digital number representations by calculating or realizing the function $y=f(x)=1000*x*r$ with $r_{system1} \neq r_{system2}$. FIG. 12B shows the output of system 1 with faults injected (1210), e.g. injected on the two's complement representation of the results of system 1 according to the previous mentioned fault injection technique. FIG. 12B also shows the generated upper boundary 1230 and lower boundary 1240.

The errors on the of the output are not exactly the same like in the example of FIGS. 6A-6G because of the random noise which is introduced by system 1 (1110*a*) and system 2 (1110*b*). However, the safety mechanism 1100 enables detection of faults on dynamic signals which would otherwise stay undetected by safety mechanism implementing duplication with only boundary checking or duplicated boundary checking, such as, for instance, errors involving the change of the sign bit of the result with index 120. Further, faults with a lower effect on the result value may also be detected e.g., the results with the indices 110, 100 and 80 as shown in FIGS. 12C and 12 D.

Figure 13A:
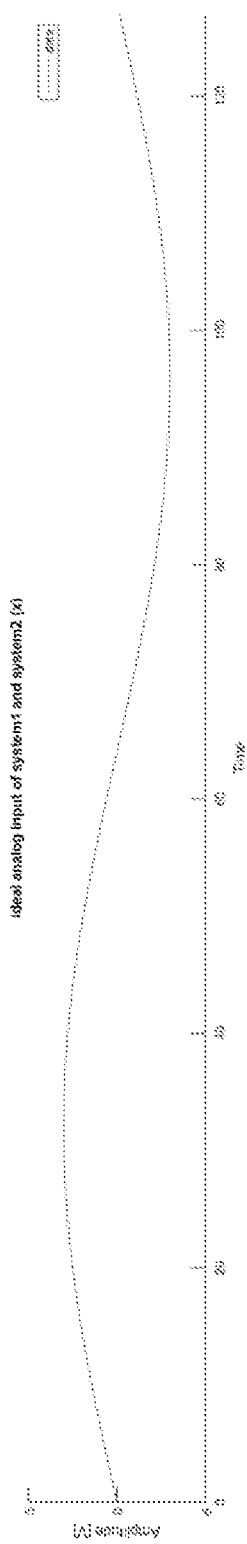
Figure 13B:
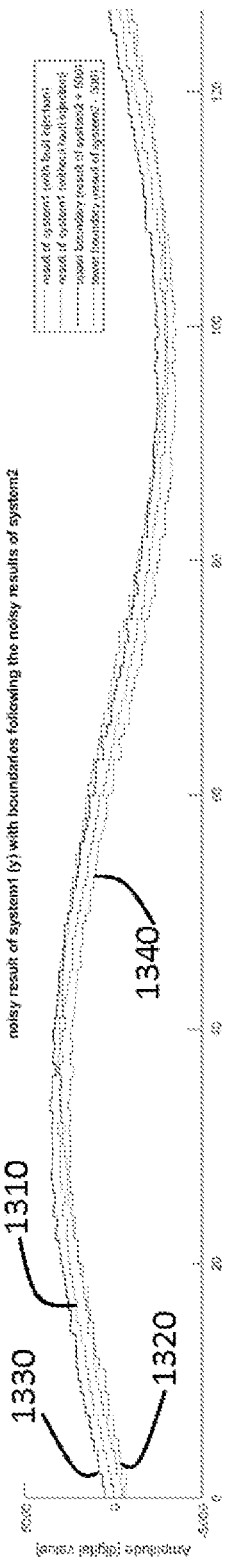
Figures 14A, 14B:
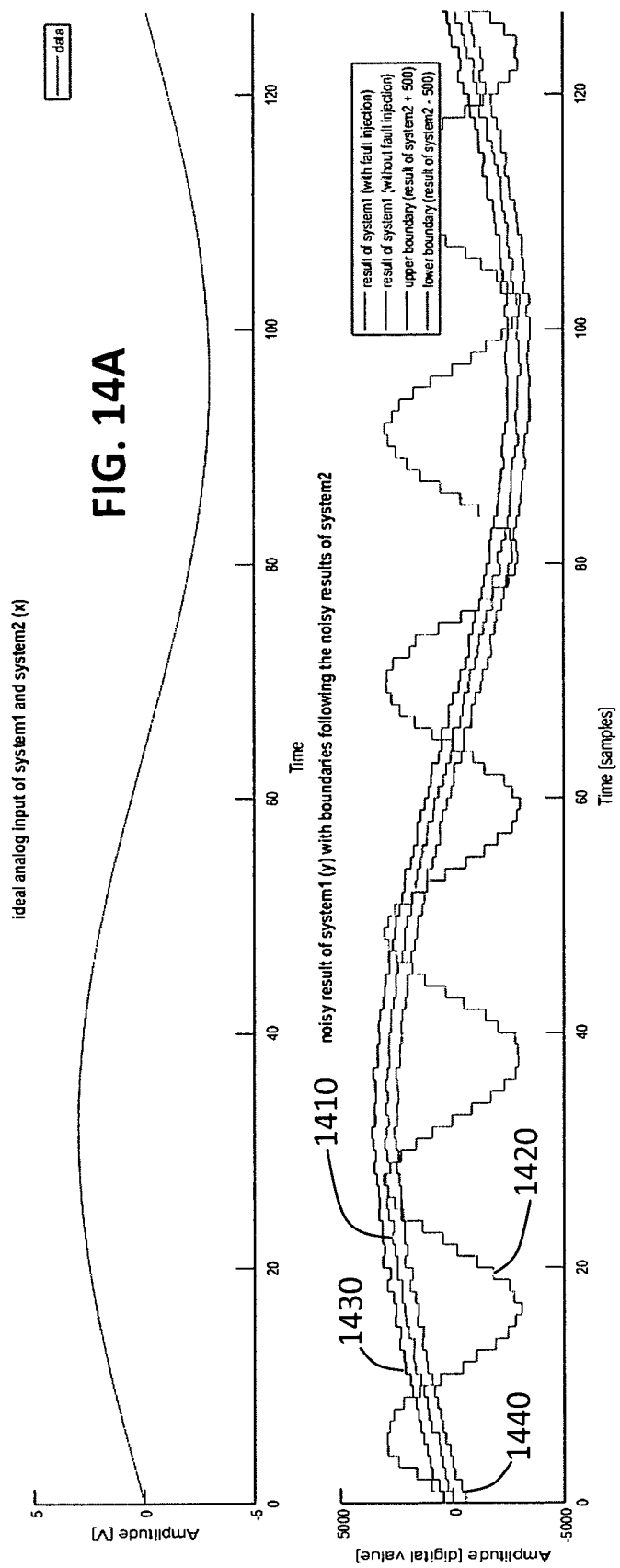

The ability of safety mechanisms such as safety mechanism 1100 to detect faults which have, for example, an effect on the phase or frequency of a sine wave is shown in the graphs of FIGS. 13A-13D and 14A-14D. For example, FIG. 13A shows the sinusoidal input. FIG. 13B shows phase errors as the noisy output result (without fault injection 1310) from system 1, the noisy output result with fault injection (1320) from system 1, the upper boundary (1330) and the lower boundary (1340). As a result, the as shown in the graphs FIGS. 13C and 13D, the upper boundary checker 1140*a* and 1140*b* respectively produce the error signals e1 and 2. Similarly, FIG. 13A shows the sinusoidal input and FIG. 14B shows phase errors as the noisy output result (1410) and the noise output result with fault injection (1420) from system 1 are superimposed with the upper (1430) and lower (1440) boundaries. Such faults could not be detected by boundary checking or duplicated boundary checking, as shown by FIGS. 7A-7G and 8A-8G. Accordingly, as shown, safety mechanisms such as safety mechanism 1100 can improve error detection for a system (e.g., system 1) in comparison to safety mechanisms merely implementing duplication with boundary checking or duplicated boundary checking.

Further, due to ability to configure or have a smaller measurement tolerance range for changing signals, the error detection capability for those signals is higher than for safety mechanisms with only duplication with boundary checking or simple duplicated boundary checking.

For the safety mechanism 1100, if the output or results of system 2 (1110*b*) are constantly 0, the error detection for errors in output or results of system 1 (1110*a*) is essentially equivalent to duplication with boundary checking or duplicated boundary checking. Since the safety mechanism 1100 enables error detection with respect amplitude, frequency, offset and phase of periodic signals it is also suited as plausibility checker.

Faults still may occur in parts or components of safety mechanisms such as the safety mechanism 1100 arrangement. These faults may change, for example, the boundaries in such a way that faults in system 1 cannot be detected anymore. Therefore, these such parts may be equipped with error detection or configured to perform or implement error correction methods. However, these additions are optional because the invention can also be used as signal monitor for non-safety relevant application. For non-safety relevant applications, a single point fault could either affect the output of system 1 for which the monitoring logic is designed to detect it or it could change the boundaries without any effect on the functionality of system 1. In this case, the fault in the monitoring logic could stay undetected until the circuitry is tested or it becomes visible anyway because the boundaries were changed. But until the fault in the monitoring logic is detected, the system could degrade to a simple converter without or with less error detection capability.

In general, duplication and comparison safety mechanism can detect only single point faults in one of the systems or its inputs. Thus, an error on a result or output of system 2 will cause a simultaneous shift of the boundaries in the same direction of the error, but the measurement tolerance range will stay the same. If a second fault in system 1 or its inputs shifts the result of system 1 by the same amount in the same direction then the probability to detect this fault is theoretically 0. In all other cases the chance to detect this fault is higher and it is theoretically 1 if the difference of the results is bigger than the measurement tolerance range.

Figure 15:
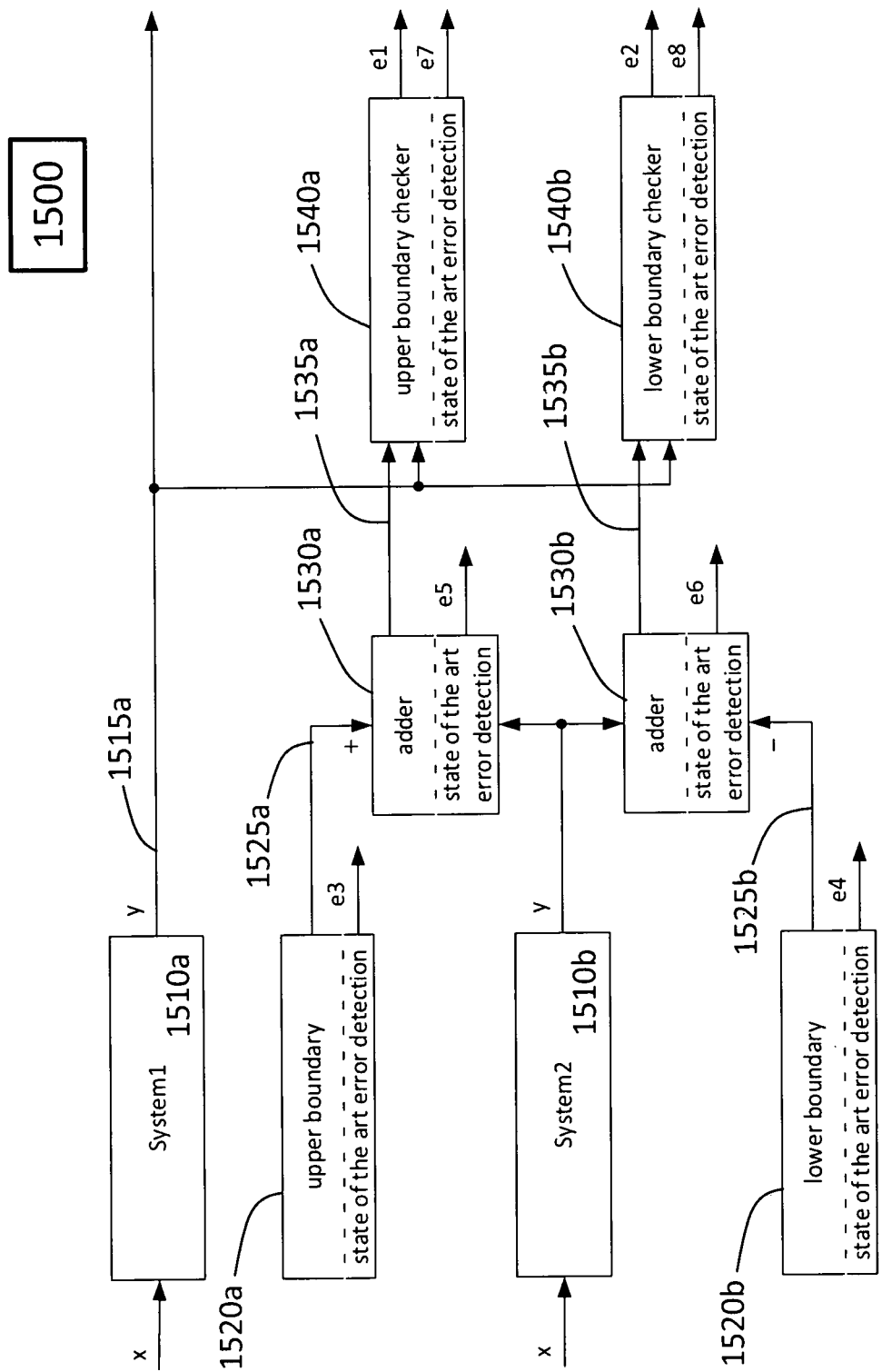
FIG. 15 shows another safety mechanism according to an exemplary embodiment of the present disclosure.

FIG. 15 shows, according to at least one exemplary embodiment of the present disclosure, a safety mechanism 1500 or arrangement including additional error detection for the monitoring logic. The safety mechanism 1500 may be similar to the safety mechanism 1100 except that several components may or can implement error detection and correction methods. The upper boundary source 1520*a* and the lower boundary source 1520*b*, which may be the same or similar in operation to the upper and lower boundary sources described herein, except they may each include or implement error detection and correction. In cases where the upper and lower boundary sources 1520*a, b* are implemented using or realized with registers, faults in such registers may be detected e.g., by implementing parity checking or duplication and comparison with self-checking comparators. Of course, other techniques known to one skill in the art may also be used and implemented.

Further, in the example of the safety mechanism 1500, the adder devices 1540*a, b* may also be equipped or configured to detect faults in the adders, such as, for example by implementing parity checking. The adder devices 1540*a, b*, may be any self-checking adder device or another type of adder device, such as carry look-ahead adders, carry skip adders or carry select adders. However, the duplication and comparison approach using self-checking comparators is another possible approach that may be effected with the adder devices 1540*a, b* to cover faults in the adders. That is, each adder may be duplicated to form a pair of adders. The output of one adder of the adder pair is then compared against the other adder of the pair.

Further, the upper and lower boundary checkers 1550*a, b* may detect faults occurring therein. For example, the boundary checkers 1550*a* may detect errors or faults e.g., by duplication and comparison or other techniques mentioned herein or known to one skilled in the art.

Figure 16:
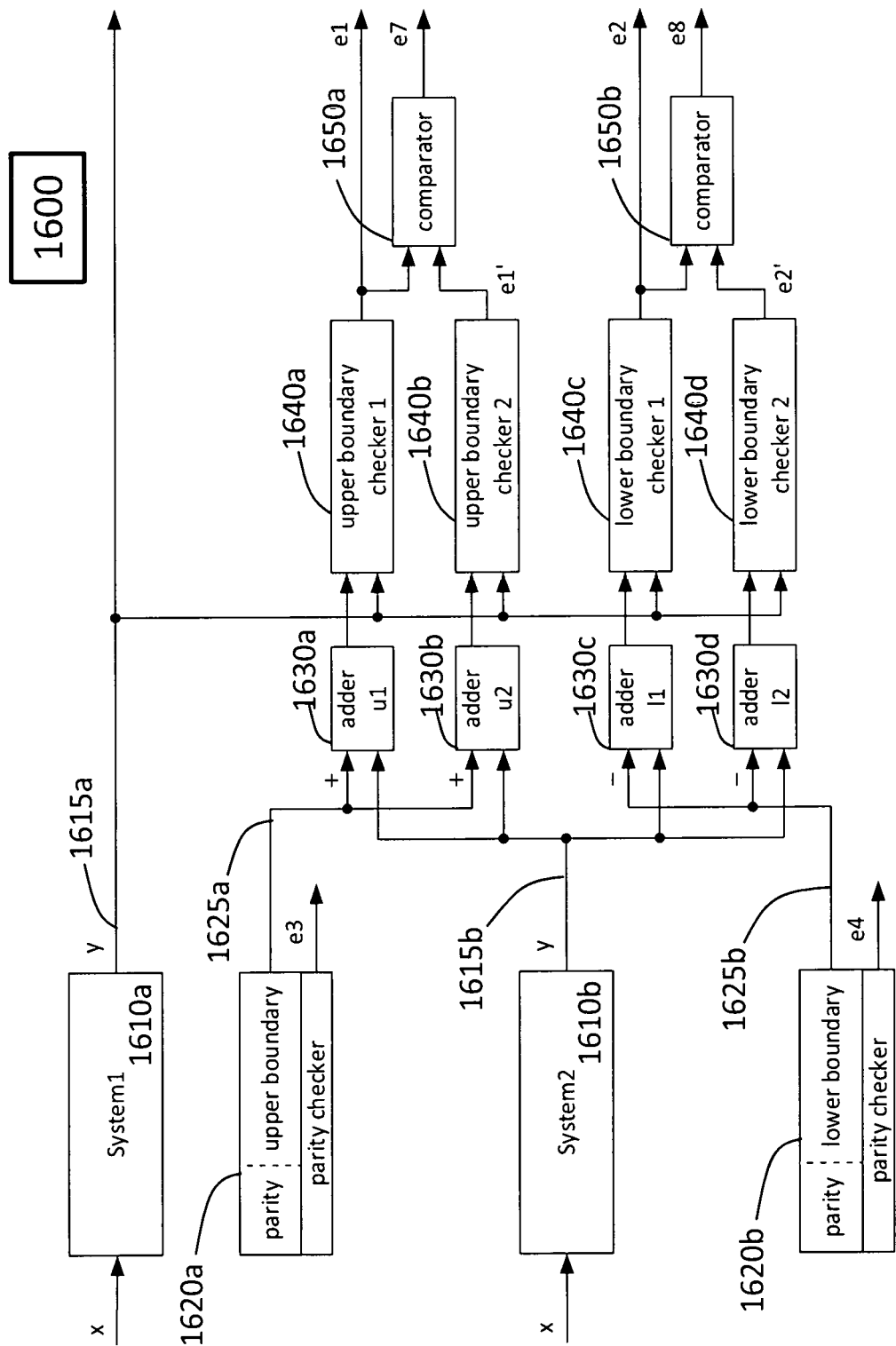
FIG. 16 shows another safety mechanism according to an exemplary embodiment of the present disclosure.
Figure 17A:
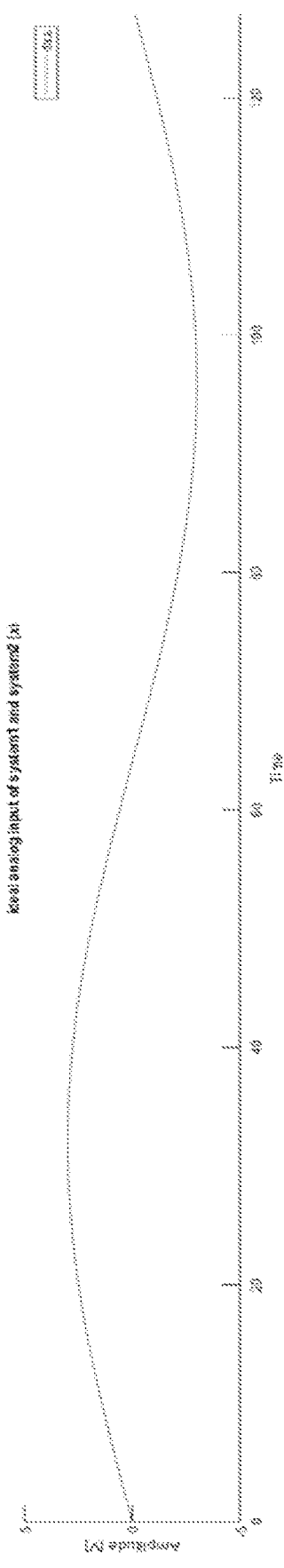
FIGS. 17A-17F include graphs of simulated inputs and results for the safety mechanism of FIG. 11.
Figure 17B:
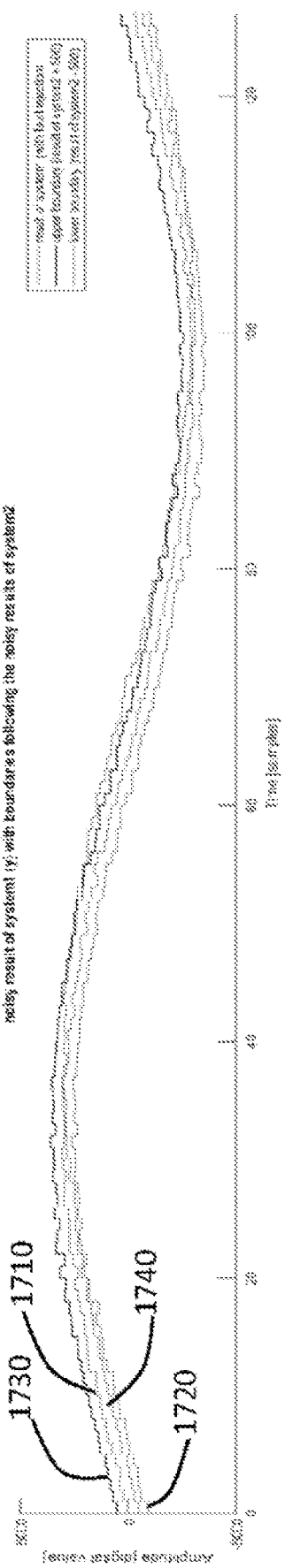
Figure 17C:
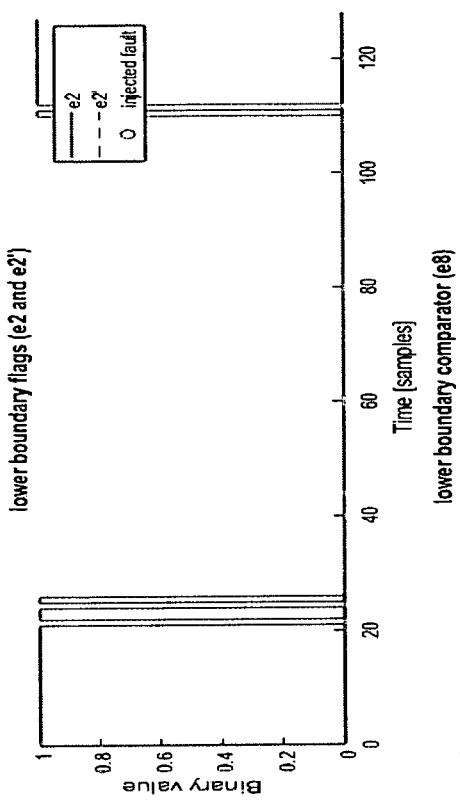
Figure 17D:
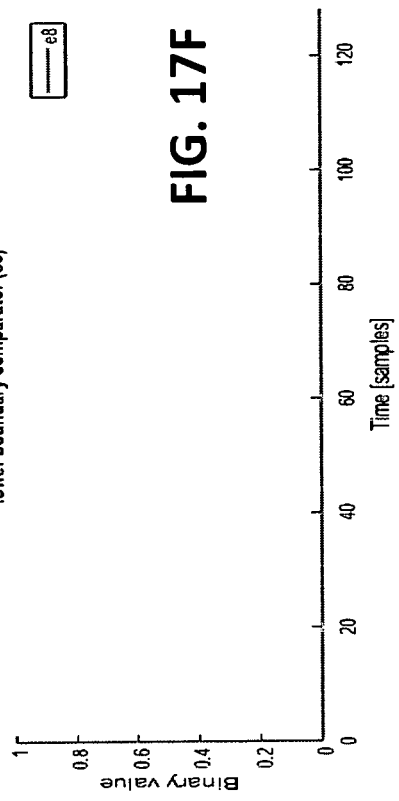
Figure 17E:
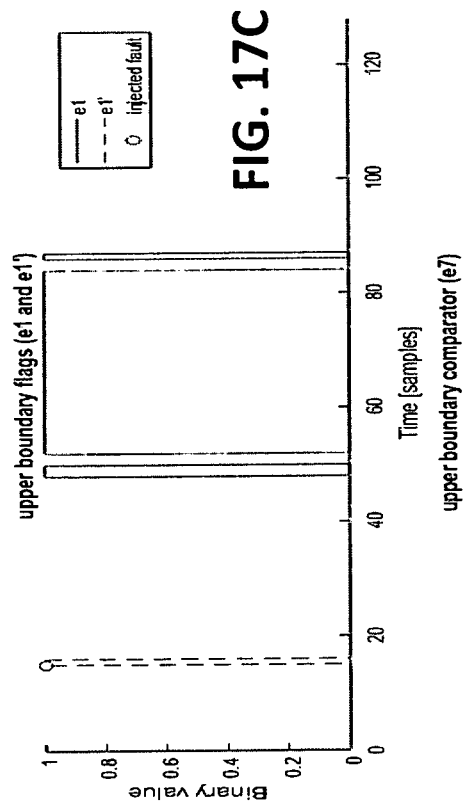
Figure 17F:
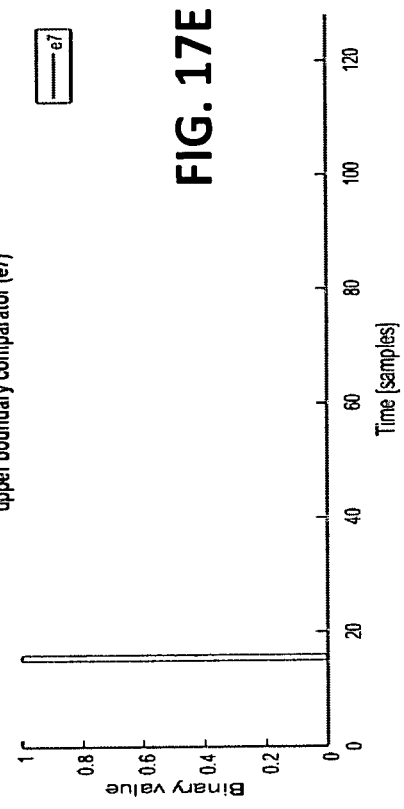

FIG. 16 depicts another safety mechanism 1600 according to at least one exemplary embodiment of the present disclosure. The arrangement or safety mechanism 1600 includes error detection for the monitoring logic. The boundary sources 1620*a, b* may include registers that include or implement parity checkers so that all single bit errors of the boundary data or boundary offset values in the registers will be detected.

As shown in FIG. 16, the safety mechanism 1600 implements duplication and comparison with respect to adders 1630*a-d*. That is, for the upper boundary, the safety mechanism 1600 includes two adders 1630*a, b*, and for the lower boundary includes two adders 1630*c, d* for the lower boundary. Each of the upper boundary adders 1630*a, b* combines (e.g., adds) the output (y) from system 2 with an upper boundary offset value provided by the upper boundary source 1620*a*. Thus, each of the upper boundary adders 1640*a, b* respectively produces or generates an upper boundary output signal.

Similarly, each of the lower boundary adders 1630*c, d* combines the output of system 2 (y) with a lower boundary offset value provided by the lower boundary source 1620*b*. Thus, each of the upper boundary adders/subtractors 1630*c, d* respectively produces or generates a lower boundary output signal.

The safety mechanism 1600 includes a checker for each adder device. The checkers 1640 a, b each obtain or receive the output of system 1 and respectively compare it against the upper boundaries generated by adder devices 1630*a, b*. The checkers 1640*c, d* each obtain the output of system 1 and respectively compare it against the lower boundaries generated by adder devices 1630*c, d*.

Thus, the example of the safety mechanism 1600 includes duplicated adders with each adder being associated with or fed into its own boundary checker. This approach is used to protect each adder together with its corresponding boundary checker against any single point fault. In general, an adder with its corresponding boundary checker can be considered as single combinational block which realizes a certain digital function for which duplication and comparison is a powerful error detection method and separate error detection does not have to be implemented for each individual functionality of this block. Of course, with respect to area this approach might be more expensive than the implementation of dedicated error detection methods for the adders and boundary checkers but this example is targeted on an implementation which is easy to realize in any design flow. In order to test the error detection methods, the circuitry can be equipped additionally with fault injection capabilities.

The functionality of the safety mechanism 1600 with respect to the upper and lower boundary checkers 1640*a, b* may be tested by inverting the boundaries so that the measured signal is always out of range. This can also be achieved by setting the upper limit to the minimum and the lower limit to the maximum of the measurement range. For this test system 2 (1610*b*), can but does not necessarily have to be, enabled. The boundary setup can be tested with dedicated system inputs. System 1 and system 2 can be tested with the boundary checking logic.

An example for the functionality of the safety mechanism 1600 of FIG. 16 can be illustrated by the graphs in FIGS. 17A-17F. The setup with respect to system 1 (1610*a*), its inputs (see FIG. 17A) and the fault injection in system 1 is the same as like in the example shown in the graphs of FIGS. 13A-13D. In the example of FIGS. 13A-13D, a fault leads to a phase shift of the measured signal.

In addition to the fault injection in system 1 or system 1610*a* (see FIG. 17B and the noisy output with fault injection 1720, upper boundary 1730 and lower boundary 1740), a fault was also injected in the upper boundary checker 1640*b* so that the boundary flag e1' (see FIG. 17C) provides wrong information at position 15. This error is detected by the upper boundary comparator and reported by the error indicator e7 (see FIG. 17E) generated by the comparator 1650*a*. By contrast the e2 and e2' flags respectively generated by the lower boundary checkers 1640*c, d* are the same (See FIG. 17D) and thus no error indicated e8 (see FIG. 17F) is generated by the comparator 1650*b*.

The safety mechanisms such as the safety mechanisms 1100, 1500, and 1600 include at least two systems (e.g., System 1 and System 2). In accordance with various embodiments, these systems may receive or output data with the same data rate, or in other cases may receive, process, and/or output signals with differing data rates. For example, System 1 can receive an input and/or an output with a data rate differing from the corresponding input and/or output of System 2. Therefore, in some examples, to deal with the different data rates, a device or mechanisms may be included in the safety mechanism in order handle or negotiate the differing data rates. That is, such a mechanism may be any suitable analog or digital component for equalizing the differing data rates. This mechanism may be included in any suitable place, including within a component such as the System 1 and/or System 2. Such a mechanism may include a decimation filter, or an interpolation component. In at least one example, a decimation filter may be included in a sigma-delta ADC.

Further, in some embodiments, safety mechanisms such as or similar to the safety mechanisms 1100, 1500, and 1600 may include a mechanism for aligning paths, e.g., output signals from System 1 and System 2. Such mechanisms may include phase shifting, or the use of equidistant sampling of an ADC to handle differing data rates and alignment of data.

Some embodiments, safety mechanisms such as or similar to the safety mechanisms 1100, 1500, and 1600 may include a user-selection feature. That is, the safety mechanism may receive user input to define the size of data being processed or output by components of the safety mechanisms, such as, for example an ADC.

The following examples pertain to further aspects of this disclosure:

Example 1 is a circuitry including a first electronic component path that includes at least one first electronic component and configured to generate a first continuous output signal; a second electronic component path comprising at least one second electronic component and configured to generate a second continuous output signal; and a boundary check circuit configured to check whether the first continuous output signal fulfills a boundary criterion describing a range for the first continuous output signal, wherein the boundary check circuit is further configured to adapt the boundary criterion in accordance with the second continuous output signal.

Example 2 is the subject matter of Example 1, wherein the boundary check circuit may be configured to adapt the boundary criterion in accordance with the second continuous output signal by: generating an upper boundary from an obtained upper boundary offset value and the second continuous output signal, and/or generating a lower boundary from an obtained lower boundary offset value and the second continuous output signal.

Example 3 is the subject matter of Example 2, wherein the boundary check circuit further may include at least one upper boundary adder configured to generate the upper boundary of the boundary criterion by adding the upper boundary offset value to the second continuous output signal, and/or at least one lower boundary adder configured to generate the lower boundary of the boundary criterion by adding a negative or inversion of the lower boundary offset value to the second continuous output signal.

Example 4 is the subject matter of any of Examples 2 or 3, wherein the boundary check circuit may further include: at least one upper boundary checker configured to compare the first continuous output signal with the upper boundary, and/or at least one lower boundary checker configured to compare the first continuous output signal with the lower upper boundary.

Example 5 is the subject matter of Example 4, wherein the at least one upper boundary checker may be further configured to generate a signal in response to the upper boundary checker determining that the first continuous output signal exceeds than the determined upper boundary, and wherein the at least one lower boundary checker may be configured to generate a signal in response to the lower boundary checker determining that the first continuous output signal falls lower than the determined lower boundary.

Example 6 is the subject matter of any of Examples 4 or 5, wherein each of the upper boundary checker and/or the lower boundary checker may include an error detection mechanism to respectively detect and correct errors in the upper boundary and lower boundary.

Example 7 is the subject matter of any of any of Examples 4 to 6, wherein the at least one at least one upper boundary checker may include two upper boundary checkers, and wherein the boundary check circuit may include a comparator coupled to the two upper boundary checkers, the comparator to compare the output signals of the two upper boundary checkers.

Example 8 is the subject matter of any of Example 4 to 7, wherein the at least one at least one lower boundary checker may include two lower boundary checkers, and wherein the boundary check circuit may include a comparator coupled to the two upper lower checkers, the comparator to compare the output signals of the two lower boundary checkers.

Example 9 is the subject matter of any of Examples 3 to 8, wherein the upper boundary adder and/or the lower boundary adder may each include an error detection mechanism configured to detect and correct errors.

Example 10 is the subject matter of any of Examples 2 to 9, further including an upper boundary source configured to provide the upper boundary offset value to the boundary check circuit further; and/or a lower boundary source configured to provide the lower boundary offset value to the boundary check circuit.

Example 11 is the subject matter of Example 10, wherein each of the upper boundary source and/or the lower boundary source may include a register configured to obtain and provide one or more boundary offset values, the register further optionally including an error detection mechanism to detect and correct errors in obtained boundary offset values.

Example 12 is the subject matter of any of Examples 10 or 11, wherein an offset value in each of the upper boundary source and/or the lower may be a predefined value.

Example 13 is the subject matter of any of Examples 10 to 11, wherein an offset value in each of the upper boundary source and/or the lower varies over time.

Example 14 is the subject matter of any of Examples 1 to 13, wherein the first continuous output signal may be a digital signal.

Example 15 is the subject matter of any of Examples 1 to 14, wherein the second continuous output signal may be a digital signal.

Example 16 is the subject matter of any of Examples 1 to 15, wherein the first electronic component path may include an analog-to-digital (ADC) circuit configured to generate the first continuous output signal.

Example 17 is the subject matter of Example 16, wherein the ADC circuit may be a sigma-delta ADC.

Example 18 is a method including: generating a first continuing output signal; generating a second continuing output signal; determining a boundary criterion adapted to the second continuing output signal, the determined boundary criterion defining a range for the first continuing output signal; and determining whether the first continuing output signal fulfills the determined boundary criterion.

Example 19 is the subject matter Example 18, wherein determining the boundary criterion may further include determining one or more boundaries relative to the second continuing signal.

Example 20 is the subject matter of Example 19, wherein the boundary criterion may include an upper boundary, wherein determining whether the first continuing output signal fulfills the determined boundary criterion may further include determining whether the first continuing output signal exceeds the upper boundary.

Example 21 is the subject matter of any of Examples 19 or 20, wherein the boundary criterion may include a lower boundary, wherein determining whether the first continuing output signal fulfills the determined boundary criterion may further include determining whether the first continuing output signal falls below the lower boundary.

Example 22 is the subject matter of any of Examples 20 or 21, the method may further include generating a signal in response to determining the first continuing output signal exceeds the upper boundary.

Example 23 is the subject matter of any of Examples 21 or 22, the method may further include generating a signal in response to determining the first continuing signal falls below the lower boundary.

Example 24 is the subject matter of any of Examples 20 to 23, further including determining the upper boundary which may include: obtaining an upper boundary offset value, and generating an upper boundary from the obtained upper boundary offset value and the second continuing output signal.

Example 25 is the subject matter of any of Examples 21 to 24, including determining the lower boundary, which may include: obtaining a lower boundary offset value, generating a lower boundary from the obtained lower boundary offset value and the second continuing output signal.

Example 26 is the subject matter of any of Example 24 or 25, wherein obtaining the upper boundary offset value and/or the lower boundary offset value may include obtaining the upper boundary offset value and/or the lower boundary offset value from one or more boundary registers.

Example 27 is the subject matter of Example 26, which may further include detecting and correcting errors, by each of the one or more boundary registers, in the boundary offset values stored therein.

Example 28 is the subject matter of any of Examples 24 to 27, wherein generating the upper boundary may include adding the second continuing output signal to the upper boundary offset value with an adder.

Example 29 is the subject matter of any of Examples 25 to 28, wherein generating the lower boundary may include adding the second continuing output signal to a negative or inversion of the lower boundary offset value with an adder.

Example 30 is the subject matter of any of Examples 18 to 30, wherein the generated first continuing output signal may be a digital signal.

Example 31 is the subject matter of any of Examples 18 to 30, wherein generating the first continuing output signal comprises providing the digital signal as an output from an analog-to-digital (ADC) converter.

Example 32 is the subject matter of Example 31, wherein the ADC converter comprises may be a sigma-delta ADC.

Example 33 is the subject matter of any of Examples 18 to 32, wherein the generated second continuing output signal may be a digital signal.

Example 34 is the subject matter of any of Examples 18 to 34, wherein generating the first continuing output signal may include generating the first continuing output signal from a first electronic component path comprising at least one first electronic component, and wherein generating the second continuing output signal may include generating the first continuing output signal from a second electronic component path comprising at least one first second component, the second electronic component path being substantially similar to the first electronic component path.

Example 35 is a non-transistor computer-readable medium including instructions that when executed by at least one processor, cause the processor to execute the method embodied in Examples 18-34.

It should be noted that one or more of the features of any of the examples above may be combined with any one of the other examples.

The foregoing description has been given by way of example only and it will be appreciated by those skilled in the art that modifications may be made without departing from the broader spirit or scope of the invention as set forth in the claims. The specification and drawings are therefore to be regarded in an illustrative sense rather than a restrictive sense.

The scope of the disclosure is thus indicated by the appended claims and all changes which come within the meaning and range of equivalency of the claims are therefore intended to be embraced.

What is claimed is:

1. A circuitry, comprising:
   a first electronic component path comprising at least one first electronic component configured to provide a function and configured to generate a first continuous output signal;
   a second electronic component path comprising at least one second electronic component designed to provide the same function as the first electronic component and configured to generate a second continuous output signal; and
   a boundary check circuit comprising:
      at least one upper boundary checker configured to compare the first continuous output signal with an upper boundary, and
      at least one lower boundary checker configured to compare the first continuous output signal with a lower boundary, wherein a difference between the upper boundary and the lower boundary correspond to a boundary criterion describing a range for the first continuous output signal, wherein the boundary check circuit is further configured to adapt the boundary criterion in accordance with the second continuous output signal.

2. The circuitry of claim 1,
   wherein the boundary check circuit is configured to adapt the boundary criterion in accordance with the second continuous output signal comprising:
      generating the upper boundary from an obtained upper boundary offset value and the second continuous output signal, and
      generating the lower boundary from an obtained lower boundary offset value and the second continuous output signal.

3. The circuitry of claim 2,
   wherein the boundary check circuit comprises:
      at least one upper boundary adder configured to generate the upper boundary of the boundary criterion by adding the obtained upper boundary offset value to the second continuous output signal, and
      at least one lower boundary adder configured to generate the lower boundary of the boundary criterion by adding a negative or inversion of the obtained lower boundary offset value to the second continuous output signal.

4. The circuitry of claim 3,
   wherein the at least one upper boundary adder and/or the at least one lower boundary adder each comprise an error detection mechanism configured to detect and correct errors.

5. The circuitry of claim 2, further comprising:
   an upper boundary source configured to provide the obtained upper boundary offset value to the boundary check circuit; and/or
   a lower boundary source configured to provide the obtained lower boundary offset value to the boundary check circuit.

6. The circuitry of claim 5,
   wherein each of the upper boundary source and/or the lower boundary source comprise a register configured to obtain and provide one or more boundary offset values, the register further including an error detection mechanism to detect and correct errors in obtained boundary offset values.

7. The circuitry of claim 5,
wherein an offset value in each of the upper boundary source and/or the lower boundary source is a predefined value.

8. The circuitry of claim 1,
wherein the at least one upper boundary checker is further configured to generate a first signal in response to the at least one upper boundary checker determining that the first continuous output signal exceeds the upper boundary, and
wherein the at least one lower boundary checker is further configured to generate a second signal in response to the at least one lower boundary checker determining that the first continuous output signal falls lower than the lower boundary.

9. The circuitry of claim 1,
wherein each of the at least one upper boundary checker and/or the at least one lower boundary checker comprises an error detection mechanism to respectively detect and correct errors in the upper boundary and the lower boundary.

10. The circuitry of claim 9,
wherein the at least one upper boundary checker comprises two upper boundary checkers, and
wherein the boundary check circuit comprises a comparator coupled to the two upper boundary checkers, the comparator to compare output signals of the two upper boundary checkers.

11. The circuitry of claim 10,
wherein the at least one lower boundary checker comprises two lower boundary checkers, and
wherein the boundary check circuit comprises a comparator coupled to the two lower boundary checkers, the comparator to compare output signals of the two lower boundary checkers.

12. The circuitry of claim 1,
wherein the first continuous output signal is a digital signal.

13. The circuitry of claim 1,
wherein the second continuous output signal is a digital signal.

14. The circuitry of claim 1,
wherein the first electronic component path comprises an analog-to-digital (ADC) circuit configured to generate the first continuous output signal.

15. The circuitry of claim 14, wherein the ADC circuit comprises a sigma-delta ADC.

16. A circuitry, comprising:
a first electronic component path comprising a first analog-to-digital (ADC) circuit and configured to generate a first continuous digital output signal;
a second electronic component path comprising a second ADC circuit and configured to generate a second continuous digital output signal; and
a boundary check circuit configured to check whether the first continuous digital output signal fulfills a boundary criterion describing a range for the first continuous digital output signal, the boundary check circuit comprising:
an upper boundary circuit configured to provide an upper boundary output signal based on the second continuous digital output signal and an upper boundary offset value,
a lower boundary circuit configured to provide a lower boundary output signal based on the second continuous digital output signal and a lower boundary offset value,
an upper boundary checker configured to provide a first error signal by comparing the first continuous digital output signal with the upper boundary output signal, and
a lower boundary checker configured to provide a second error signal by comparing the first continuous digital output signal with the lower boundary output signal, the second error signal differing from the first error signal.

17. The circuitry of claim 16, further comprising:
wherein the first ADC circuit includes a first ADC output on which the first continuous digital output signal is generated and the second ADC circuit includes a second ADC output on which the second continuous digital output signal is generated;
wherein the upper boundary circuit includes a first upper boundary circuit input, a second upper boundary circuit input, and an upper boundary circuit output, the first upper boundary circuit input configured to receive the upper boundary offset value and the second upper boundary circuit input coupled to the second ADC circuit;
wherein the lower boundary circuit includes a first lower boundary circuit input, a second lower boundary circuit input, and a lower boundary circuit output, the first lower boundary circuit input configured to receive the lower boundary offset value and the second lower boundary circuit input coupled to the second ADC circuit.

18. The circuitry of claim 17,
wherein the upper boundary checker includes a first upper boundary input coupled to the upper boundary circuit output, a second upper boundary input coupled to the first ADC, and an upper boundary output on which the first error signal is provided; and
wherein the lower boundary checker includes a first lower boundary input coupled to the lower boundary circuit output, a second lower boundary input coupled to the first ADC, and an upper boundary output on which the second error signal is provided.

* * * * *